(12) United States Patent
Okamoto

(10) Patent No.: US 10,878,688 B2
(45) Date of Patent: Dec. 29, 2020

(54) MONITORING SYSTEM AND MONITORING METHOD

(71) Applicant: ASAHI KASEI KABUSHIKI KAISHA, Tokyo (JP)

(72) Inventor: Akihiro Okamoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/750,332

(22) Filed: Jan. 23, 2020

(65) Prior Publication Data

US 2020/0168076 A1    May 28, 2020

Related U.S. Application Data

(63) Continuation of application No. PCT/JP2018/028158, filed on Jul. 26, 2018.

(30) Foreign Application Priority Data

Jul. 26, 2017   (JP) ................. 2017-144747

(51) Int. Cl.
*G08B 25/04*   (2006.01)
*H04N 7/18*    (2006.01)

(52) U.S. Cl.
CPC ............ *G08B 25/04* (2013.01); *H04N 7/18* (2013.01)

(58) Field of Classification Search
CPC ................... G08B 25/04; H04N 7/18
See application file for complete search history.

(56) References Cited

U.S. PATENT DOCUMENTS

| 6,819,353 | B2  | 11/2004 | Heyden |
| 10,740,623 | B2 * | 8/2020 | Ebihara .................. G06T 7/20 |

(Continued)

FOREIGN PATENT DOCUMENTS

| JP | 2004-102522 A | 4/2004 |
| JP | 2004-258937 A | 9/2004 |

(Continued)

OTHER PUBLICATIONS

International Preliminary Report on Patentability dated Jan. 28, 2020, issued in corresponding International Patent Application No. PCT/JP2018/028158.

(Continued)

*Primary Examiner* — Jefferey F Harold
*Assistant Examiner* — Justin B Sanders
(74) *Attorney, Agent, or Firm* — Morgan, Lewis & Bockius LLP

(57) ABSTRACT

A monitoring system including: a true image generation unit that generates a true image by subjecting a current image that is a latest captured image to a privacy protection process, a false video storage unit that stores a video or a still image and be capable of extracting one frame of the video or the still image as a false image for determining whether or not a monitoring is being appropriately performed by a monitoring person, an image transmission unit that transmits a monitoring target image generated on a basis of the false image to a terminal device, and a notification determination unit that, upon receipt of information that a notification event has been discovered in the monitoring target image by a user of the terminal device, determines whether or not the monitoring target image notified of the discovery is an image generated on the basis of the false image.

31 Claims, 14 Drawing Sheets

(56) References Cited

U.S. PATENT DOCUMENTS

| | | |
|---|---|---|
| 2002/0039135 A1 | 4/2002 | Heyden |
| 2002/0135483 A1 | 9/2002 | Merheim et al. |
| 2003/0043160 A1 | 3/2003 | Elfving et al. |
| 2009/0160657 A1 | 6/2009 | Merheim et al. |
| 2018/0262724 A1* | 9/2018 | Ross .................... H04N 7/188 |

FOREIGN PATENT DOCUMENTS

| | | |
|---|---|---|
| JP | 2004-287922 A | 10/2004 |
| JP | 2005-333415 A | 12/2005 |
| JP | 2008-312026 A | 12/2008 |
| JP | 2009-206617 A | 9/2009 |
| JP | 4578044 B2 | 11/2010 |
| JP | 2015-070401 A | 4/2015 |
| JP | 2015-162157 A | 9/2015 |
| JP | 6156665 B1 | 7/2017 |

OTHER PUBLICATIONS

International Search Report (with partial translation) and Written Opinion dated Oct. 16, 2018, issued in corresponding International Patent Application No. PCT/JP2018/028158.

\* cited by examiner

MONITORING SYSTEM AND MONITORING METHOD

CROSS-REFERENCE TO RELATED APPLICATION

This application is a continuation application of International Application PCT/JP2018/028158 filed on Jul. 26, 2018 and designated the U.S., the entire contents of which are incorporated herein by reference.

TECHNICAL FIELD

The present invention relates to a monitoring system and a monitoring method.

BACKGROUND ART

Conventionally, a monitoring system has been proposed that images a predetermined space and displays a video obtained by the imaging on a display located in a remote place (see JP 2008-312026A). The monitoring system is adapted to allow a monitoring person to monitor the video on the display and discover a crime or the like.

However, in the monitoring system disclosed in JP 2008-312026 A, for example, when the monitoring person has a low ability to discover a crime or the like, crimes or the like may be overlooked, and monitoring may not be appropriately performed.

SUMMARY OF INVENTION

Technical Problem

The present invention has focused on the problem as described above, and it is an object of the invention to provide a monitoring system and a monitoring method capable of determining whether monitoring is being appropriately performed.

Solution to Problem

To solve the above problem, according to an aspect of the present invention, there is provided a monitoring system (1) including a server apparatus and an image capturing device configured to capture an image of a predetermined space to be monitored and output the captured image to the server apparatus, in which (2) the server apparatus includes a current image acquisition unit configured to acquire a latest captured image as a current image, (3) a true image generation unit configured to generate, as a true image, an image obtained by subjecting a current image to a privacy protection process that makes it difficult to identify a person in the current image, (4) a false video storage unit configured to store a video, a still image, or information to generate a still image and to extract one frame of the video or the still image as a false image for use in determining whether or not a monitoring is being appropriately performed by a monitoring person, (5) an image transmission unit configured to transmit a monitoring target image generated on a basis of either the true image or the false image or a monitoring target image generated on a basis of both the true image and the false image to a terminal device, (6) a notification reception unit configured to receive, from the terminal device, discovery status information indicating whether or not a user of the terminal device has discovered a notification event that should be notified in the monitoring target image, and a notification determination unit configured to, upon receipt of the discovery status information that a notification event has been discovered, determine whether or not the monitoring target image notified of the discovery is an image generated on the basis of only the false image or an image generated on the basis of both the true image and the false image, namely, an image generated on the basis of the false image. Hereinafter, an image generated on the basis of only the false image and an image generated on the basis of both the true image and the false image will be generally referred to as image generated on the basis of the false image.

According to another aspect of the present invention, there is provided a monitoring system (1) configured to display a monitoring target image received from a server apparatus on a terminal device and transmit a status on whether or not a user of the terminal device has discovered a notification event in the monitoring target image as discovery status information to the server apparatus, in which (2) the monitoring target image is an image generated on a basis of either a true image or a false image or an image generated on a basis of both the true image and the false image; in which (3) the true image is an image obtained by using, as a current image, a latest captured image of a predetermined space to be monitored by an image capturing device and subjecting the current image to a privacy protection process that makes it difficult to identify a person in the current image; in which (4) the false image is an image for use in determining whether or not a monitoring is being appropriately performed by a monitoring person, the false image being an image extracted in a unit of frame from a video or a still image; and in which (5) when the discovery status information is information that a notification event has been discovered, it is determined whether or not the monitoring target image notified of the discovery is an image generated on the basis of the false image.

According to another aspect of the present invention, there is provided a monitoring method including (1) a step (a) of capturing an image of a predetermined space to be monitored and outputting the captured image to a server apparatus; (2) a step (b) of acquiring a latest captured image as a current image; (3) a step (c) of transmitting a monitoring target image generated on a basis of either a true image or a false image or a monitoring target image generated on a basis of both the true image and the false image to a terminal device; (4) a step (d) of transmitting, as discovery status information, a status on whether or not a user of the terminal device has discovered a notification event in the monitoring target image to the server apparatus from the terminal device; and (5) a step (e) of, upon receipt of the discovery status information that a notification event has been discovered, determining whether or not the monitoring target image notified of the discovery is an image generated on the basis of the false image, in which (6) the true image is an image generated by subjecting the current image to a privacy protection process that makes it difficult to identify a person in the current image, and (7) the false image is an image for use in determining whether or not a monitoring is being appropriately performed by a monitoring person, the false image being an image extracted in a unit of frame from a video or a still image.

Advantageous Effects of Invention

According to the present invention, for example, upon receipt of the discovery status information that a notification event has been discovered from the terminal device, it is possible to determine whether or not a monitoring target image generated on the basis of the false image had been transmitted. Additionally, it is also possible to detect a situation in which in spite of transmission of the monitoring target image generated on the basis of the false image, the discovery status information that a notification event has been discovered has not been received from the terminal device. Thus, there can be provided a monitoring system and a monitoring method capable of determining whether or not a monitoring is being appropriately performed on the terminal device side.

DESCRIPTION OF EMBODIMENTS

Hereinafter, a monitoring system according to the first to fifth embodiments of the present invention will be described with reference to the drawings. In the description of the drawings below, the same or similar portions are denoted by the same or similar reference signs, and the description of the monitoring system according to the first to fifth embodiments omit overlapping description regarding substantially the same structures and the like. The monitoring system according to the first to fifth embodiments of the invention allows not specialists but ordinary people to monitor whether an event to be notified, such as a crime, has occurred in a facility to be monitored (for example, a nursing home, a preschool, or a bar).

Note that the following first to fifth embodiments exemplify devices and methods for embodying the technological idea of the present invention, and do not specify the shapes, structures, arrangements, and the like of components to those described below. Various modifications can be made to the technological idea of the invention without departing from the technological scope prescribed by the claims.

First Embodiment (Structure)

Figure 1:
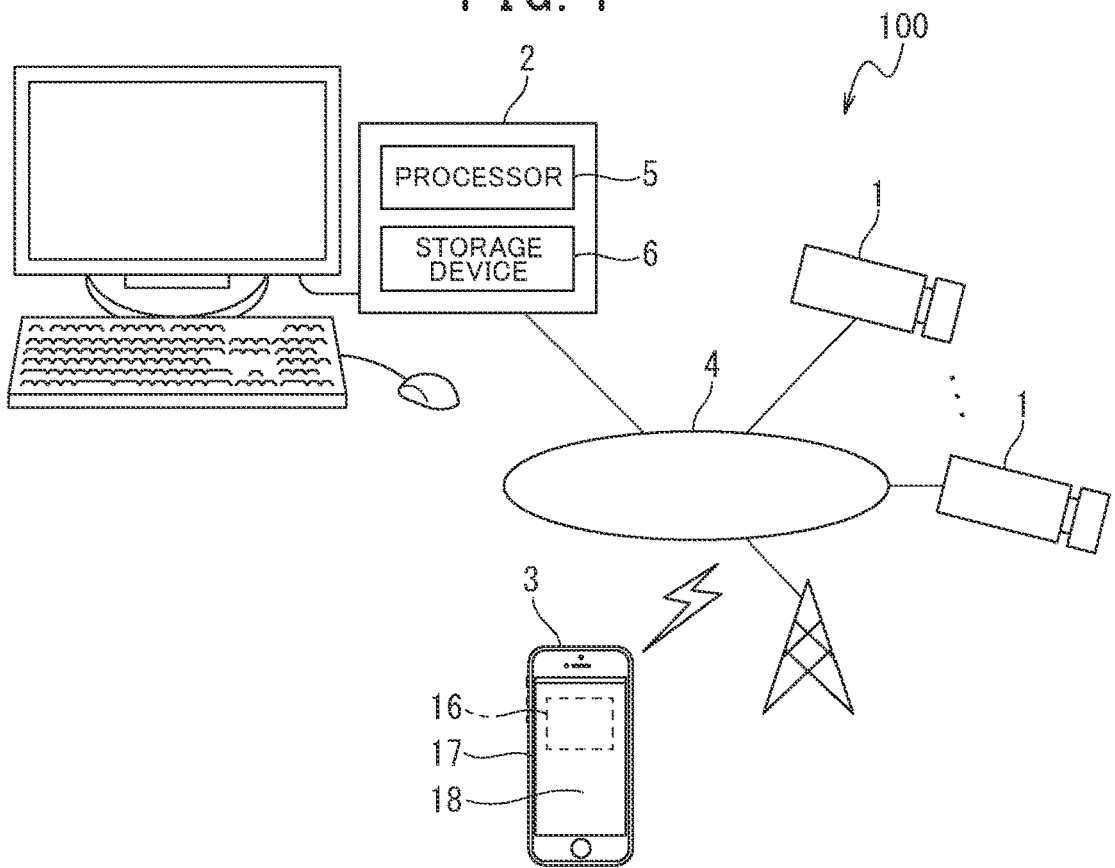
FIG. 1 is a conceptual diagram illustrating the structure of a monitoring system according to a first embodiment and a fifth embodiment of the present invention.

A monitoring system 100 according to the first embodiment of the present invention includes a plurality of image capturing devices 1, a server apparatus 2, and a terminal device 3, as illustrated in FIG. 1. The image capturing devices 1 and the server apparatus 2, and the server apparatus 2 and the terminal device 3 are connected to each other via a communication network 4 such as the Internet or a mobile phone network so that various data such as image data can be transmitted and received to and from each other. Additionally, the image capturing devices 1 may be provided with a microcomputer, so that some functions of the server apparatus 2, such as an image processing function for protecting privacy and a function for detecting people that will be described later, can be moved thereto. In addition, the plurality of image capturing devices 1 may be installed in one facility, and each of the image capturing devices 1 may be directly connected to the server apparatus 2 by a cable, not via the communication network 4. When each image capturing device 1 is directly connected to the server apparatus 2 by the cable, the image processing function for protecting privacy and the function for detecting people can be left in the server apparatus 2, while the remaining functions can be moved to another server apparatus connected via the communication network 4.

The image capturing devices 1 captures an image of a predetermined space in a monitoring target facility. Then, the captured image data is output to the server apparatus 2. As the image capturing devices 1, for example, a video camera, a web camera, a surveillance camera, or a camera attached to a computer can be used.

To simplify description, in the monitoring system 100 according to the first embodiment of the present invention, the server apparatus 2 and the terminal device 3 are provided one by one.

The server apparatus 2 includes hardware resources such as a processor 5 and a storage device 6.

Figure 2:
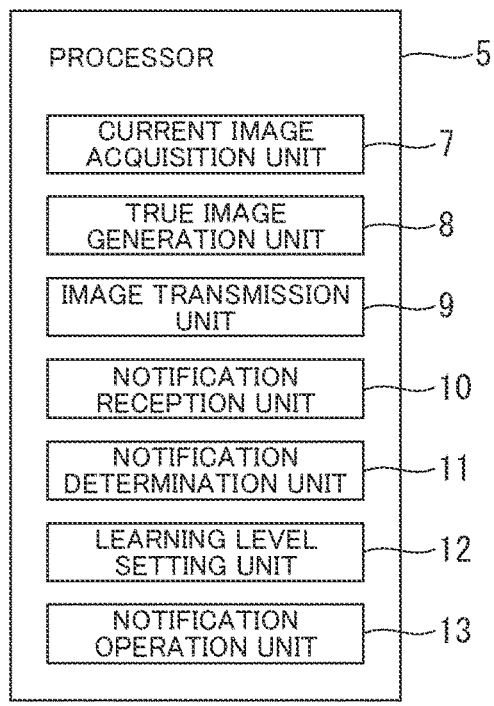
FIG. 2 is a block diagram illustrating the internal structure of a processor of a server apparatus.

The processor 5 functions as a current image acquisition unit 7, a true image generation unit 8, an image transmission unit 9, a notification reception unit 10, a notification determination unit 11, a learning level setting unit 12, a notification operation unit 13, and the like, as illustrated in FIG. 2. The representation of the internal structure of the processor 5 illustrated in FIG. 2 does not mean dedicated integrated circuits or functional blocks each independently present as a physical region on a semiconductor chip. The current image acquisition unit 7, the true image generation unit 8, the image transmission unit 9, the notification reception unit 10, the notification determination unit 11, the learning level setting unit 12, the notification operation unit 13, and the like are implemented by software.

Figure 3:
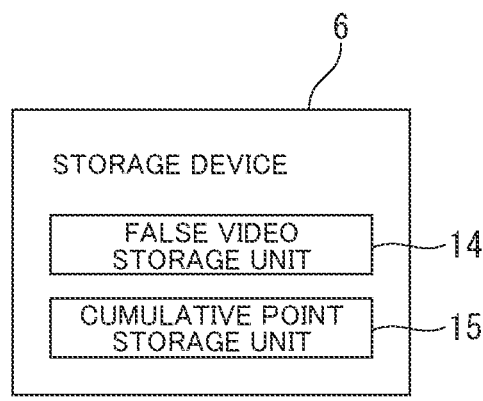
FIG. 3 is a block diagram illustrating the internal structure of a storage device of the server apparatus.

As illustrated in FIG. 3, the storage device 6 includes a false video storage unit 14 and a cumulative point storage unit 15. The representation of an internal structure of the storage device 6 illustrated in FIG. 3 does not necessarily means a storage device independently present as a physical region. For example, different regions in one storage device can be used to implement the false video storage unit 14 and the cumulative point storage unit 15.

The false video storage unit 14 stores, as a video, a plurality of videos (hereinafter also referred to as "false videos") created to resemble a video obtained by at least one of the image capturing devices 1 upon occurrence of an event to be notified in a predetermined space of a facility to be captured. Each false video is stored in a format extractable in units of frames. For example, a format compressed using similar information between frames or a format in which each frame is independent can be employed. Then, as the false video, one frame of the video is extracted as a false image that is to be used to determine whether or not a monitoring is being appropriately performed by an ordinary person who is a monitoring person.

Note that, while the monitoring system 100 according to the first embodiment of the present invention has been illustrated as an example of the structure in which the false video storage unit 14 stores a video as false videos, and one frame of the video is extractable as a false image, other structures can also be employed. For example, a structure may be employed where a still image created to resemble a video (a still image) obtained by at least one of the image capturing devices 1 upon occurrence of an event to be notified in a predetermined space of a facility to be captured is stored, and the still image is extractable as a false image. Without recording a video or a still image as a false image in a nonvolatile memory, similar still images may be dynamically generated using computer graphics and sequentially stored in a volatile memory forming the false video storage unit 14. Additionally, the false video storage unit 14 may be configured to store information for generating such a video or still image. As the above information, for example, vector data, the address of a server storing a video or a still image, search criteria for a video or a still image, and the like can be used. Then, the false video storage unit 14 may be configured to be capable of extracting, as a false image, one frame of a video or a still image obtained by generating, acquiring, or searching on the basis of the above information.

As a method for generating a false video, for example, there can be used a method of generating a false video by actually causing an event to be notified in the predetermined space and imaging by at least one of the image capturing devices 1 or a method of generating a false video by synthesizing a video (for example, an unmanned background image) captured by at least one of the image capturing devices 1 with a video of an event to be notified (for example, a foreground video of a person who is committing a crime). To determine whether monitoring is being appropriately performed, for example, the false video may be subjected to a privacy protection process that is subjected to a true image, which process will be described later, so as to make it look like the true image, and then stored in the false video storage unit 14. Alternatively, for example, the false video may be stored in the false video storage unit 14 without being subjected to the privacy protection process. When storing the false video without subjecting to the privacy protection process, the privacy protection process may be performed when generating a monitoring target image on the basis of a false image extracted in units of frames from the false video.

In addition, for example, when two or more false videos are stored in the false video storage unit 14, a difficulty level for discovering the occurrence of an event to be notified may be set for each of the false videos. In other words, the false video storage unit 14 can store a plurality of false videos having different difficulty levels. Note that the difficulty level of the false video may be set in units of false videos, in units of sections formed by dividing one false video by time, or in units of false images, namely, in units of frames.

The cumulative point storage unit 15 stores a cumulative value of given points (hereinafter also referred to as "the number of cumulative points") when point (s) is (are) given to a user of the terminal device 3, as will be described later. The number of cumulative points is stored for each terminal device 3 or each user having the terminal device 3.

The terminal device 3 includes hardware resources such as a processor 16, an image display unit 17, and an input reception unit 18. As the terminal device 3, for example, a smartphone can be used. As the user of the terminal device 3, for example, not a surveillance specialist but an ordinary person can be employed.

Figure 4:
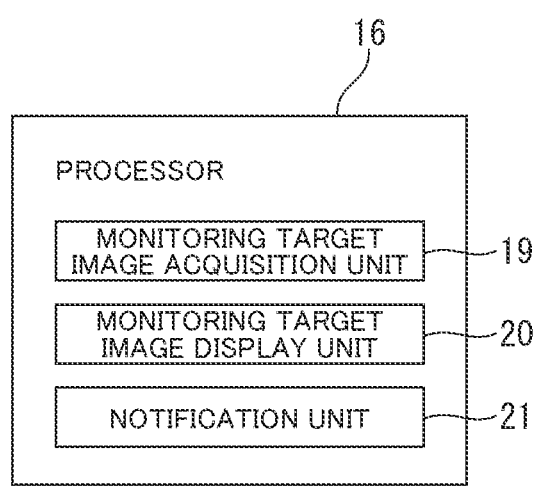
FIG. 4 is a block diagram illustrating the internal structure of a processor of a terminal device.

The processor 16 functions as a monitoring target image acquisition unit 19, a monitoring target image display unit 20, a notification unit 21, and the like, as illustrated in FIG. 4. The representation of an internal structure of the processor 16 illustrated in FIG. 4 does not mean dedicated integrated circuits and functional blocks each independently present as a physical region on a semiconductor chip. The monitoring target image acquisition unit 19, the monitoring target image display unit 20, the notification unit 21, and the like are implemented by software executed by the processor 16.

The image display unit 17 displays a monitoring target image acquired by the monitoring target image acquisition unit 19 of the processor 16 according to a signal from the monitoring target image display unit 20 of the processor 16, as will be described later. As the image display unit 17, for example, a liquid crystal display can be used.

The input reception unit 18 receives input from the user of the terminal device 3. As the input reception unit 18, for example, a touch panel sensor attached on a display surface of the image display unit 17 can be used. Then, the input reception unit 18 outputs the received input to the processor 16.

(Server-Side Process)

Next, a server-side process that is executed by the processor 5 of the server apparatus 2 will be described. The server-side process is executed when a system administrator of the monitoring system 100 performs an operation for starting a predetermined server-side process in the server apparatus 2. Upon start of the server-side process, a scene switching flag for displaying by switching a monitoring target facility at constant time intervals is set to an ON-state.

Figure 5:
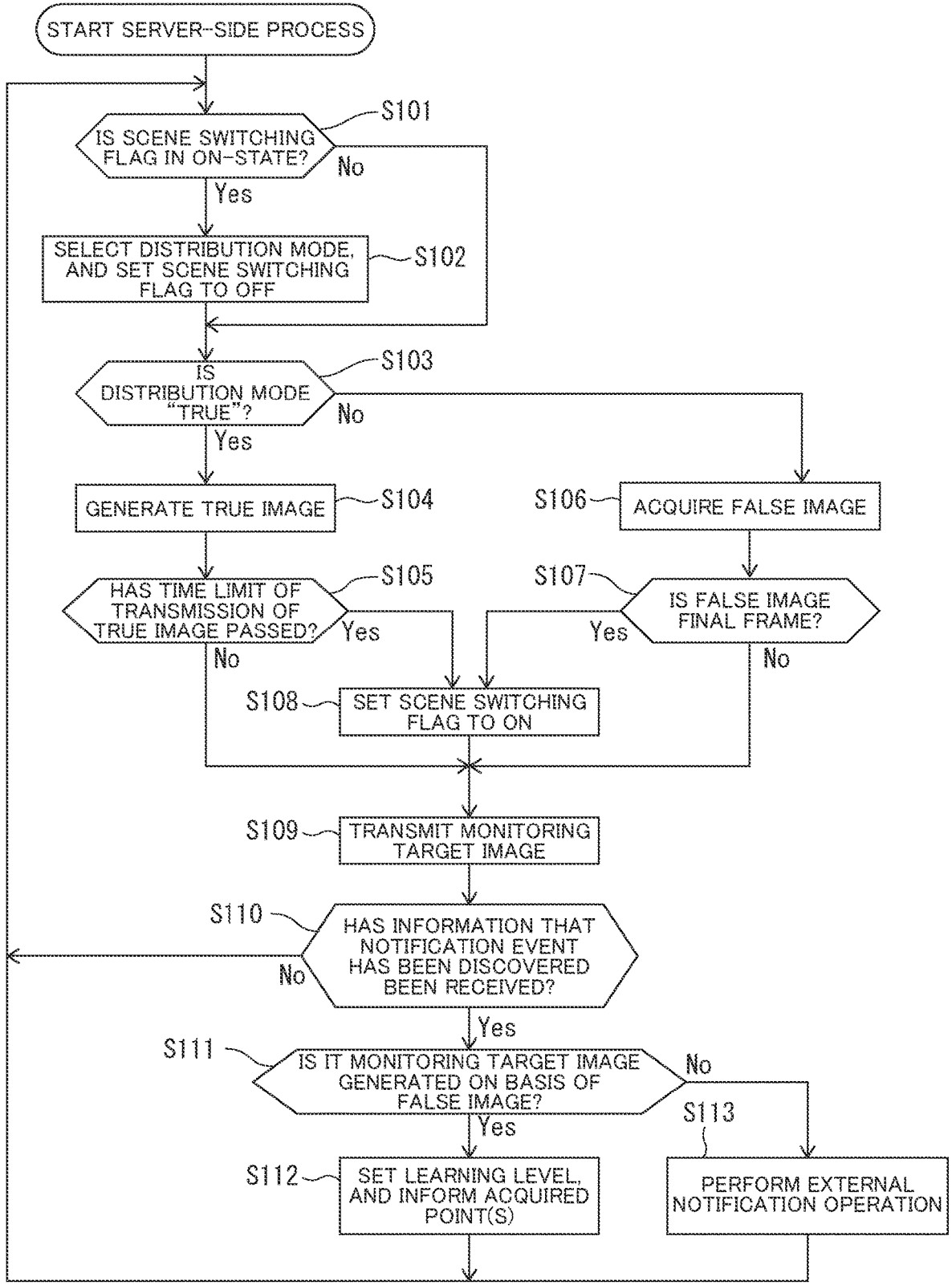
FIG. 5 is a flowchart illustrating a server-side process.

As illustrated in FIG. 5, first, at step S101, the image transmission unit 9 determines whether or not the scene switching flag is in the ON-state. Then, if the image transmission unit 9 determines that the scene switching flag is in the ON-state (Yes), the process proceeds to step S102. On the other hand, if the image transmission unit 9 determines that the scene switching flag is not in the ON-state but in an OFF-state (No), the process proceeds to step S103.

At step S102, the image transmission unit 9 selects any image capturing device 1 to be used from among the plurality of image capturing devices 1. Next, the image transmission unit 9 selects whether to transmit a image true image obtained by subjecting a image output from the selected image capturing device 1 to the privacy protection process (hereinafter also referred to as "true image") or the false image stored in the false video storage unit 14. The selection as to whether to transmit the true image or the false image may be made, for example, randomly with a probability that a ratio between a transmission time of the true image and a transmission time of the false image becomes a predetermined ratio. To randomly select with the probability that the ratio becomes a predetermined ratio, the image transmission unit 9 may be configured to be capable of providing a mechanism for changing the percentage in each monitoring target facility. This allows for management by distinguishing between a facility in which a false image is likely to be selected and a facility in which a false image is unlikely to be selected.

Then, if the image transmission unit 9 selects transmission of the true image, the distribution mode is set to "true". On the other hand, if transmission of the false image is selected, the distribution mode is set to "false". When the distribution mode is set to "false", one false image is extracted at random from among the plurality of false videos stored in the false video storage unit 14. When the difficulty level is set for each false video, a false video having a difficulty level in accordance with a learning level of the user of the terminal device 3 may be selected. Next, the image transmission unit 9 sets the scene switching flag to the OFF-state, and then, the process proceeds to step S103.

At step S103, the image transmission unit 9 determines whether the distribution mode set at step S102 is "true" or not. Then, if the distribution mode is determined to be "true" (Yes), the process proceeds to step S104. On the other hand, if it is determined that the distribution mode is not "true", that is, "false" (No), the process proceeds to step S106.

At step S104, the current image acquisition unit 7 acquires a latest captured image of the image data output from the image capturing device 1 (hereinafter also referred to as "current image"). Next, the true image generation unit 8 performs a process (hereinafter also referred to as "privacy protection process") that makes it difficult to identify a person in the current image on the acquired current image to generate a true image. As a method for the privacy protection process, for example, a method of extracting a contour of a foreground image of the current image and overwriting it on a background image or a method of performing a mosaic process on the entire current image can be used. In addition, if only for privacy protection, there is a method of detecting a person in the image and overwriting, for example, an avatar on the detected region. However, this method cannot be used for monitoring the occurrence of a crime.

Sequentially, the process proceeds to step S105, and the image transmission unit 9 determines whether or not a predetermined transmission time limit of the true image has passed after starting the transmission of the true image at step S104. As the transmission time limit of the true image, for example, a duration of human concentration (for example, five minutes) obtained by experiments and like can be used. Then, if the image transmission unit 9 determines that the transmission time limit of the true image has passed (Yes), the process proceeds to step S108. On the other hand, if the image transmission unit 9 determines that the transmission time limit of the true image has not passed (No), the process proceeds to step S109.

On the other hand, at step S106, the image transmission unit 9 acquires one frame (a false image) of the false video selected at step S102. Specifically, the image transmission unit 9 acquires the false image of a first frame of the false video, and then, acquires the false image of a next frame of a false image acquired immediately before this step every time the step is executed.

Next, the process proceeds to step S107, and the image transmission unit 9 determines whether or not the false image acquired at step S106 is a final frame of the false video selected at step S102. Then, if it is determined to be the final frame (Yes), the process proceeds to step S108. On the other hand, if it is determined not to be the final frame (No), the process proceeds to step S109.

At step S108, the image transmission unit 9 switches the scene switching flag to the ON-state, and then, the process proceeds to step S109. As a result, setting of the distribution mode can be executed again.

At step S109, the image transmission unit 9 generates an image to be monitored (hereinafter also referred to as "monitoring target image") on the basis of either the true image generated at step S104 or the false image acquired at step S106. As a method for generating a monitoring target image on the basis of the true image, for example, a method of using the true image itself as a monitoring target image can be used.

In addition, as a method for generating a monitoring target image on the basis of the false image, for example, a method of using the false image itself as a monitoring target image can be used if the privacy protection process has been performed on the false video from which the false image had been acquired. Alternatively, for example, if the privacy protection process has not been performed on the false video from which the false image had been acquired, there can be used a method of subjecting the false image to the privacy protection process to generate a monitoring target image, as described above.

Additionally, although not described in the flowchart, it is also possible to generate a new false image by superimposing together the true image and the false image created by any of these methods or replacing a part of the true image with a part of the false image.

In that case, it may be determined whether a predetermined time has not passed since a point was given at step S112 as will be described later, and if it is determined to be within the predetermined time, the given point(s) and the number of cumulative points may be overwritten on the monitoring target image and informed the user of the terminal device 3 in order to notify that the task of transmitting discovery status information that a notification event has been discovered has been properly handled.

Next, after completing the generation of the monitoring target image, the image transmission unit 9 transmits the generated monitoring target image data to the terminal device 3. The transmission of the monitoring target image data is performed via the communication network 4.

As described above, the monitoring system 100 according to the first embodiment of the present invention is configured to transmit, to the terminal device 3, an image (a monitoring target image) obtained by subjecting a true image generated using a current image to the privacy protection process that makes it difficult to identify a person reflected in the current image. Thus, the monitoring target image can be monitored by an ordinary person, without causing any privacy problem due to the monitoring target image. This allows many more people to monitor the monitoring target image, and enables real-time monitoring of the monitoring target image of a wider area, so that a red-handed crime can be more surely detected, and a criminal committing the red-handed crime can be caught. As a result, it becomes unnecessary to identify a criminal from a monitoring target image, and for example, even when the criminal disguises himself or herself, he or she can be caught.

As a side note, for example, in a method of identifying a criminal from a recorded video after the occurrence of a crime, it is impossible to identify the person when the criminal disguises himself or herself, due to which it is difficult to catch the criminal, and crime prevent effect is weak.

Additionally, the monitoring system 100 according to the first embodiment of the present invention is configured to transmit not only a true image but also a false image. Here, since the true image is one subjected to the privacy protection process that makes it difficult to identify a person, information therein is less than that of the original image. Due to that, it is difficult for an ordinary person to determine by watching the true image whether or not an event to be notified has occurred. It is also difficult for an ordinary person who is not a surveillance professional to maintain concentration. On the other hand, the monitoring system 100 according to the first embodiment of the invention can show the user of the terminal device 3 a false image subjected to a privacy protection process for protecting privacy, similarly to a true image. The false image is resembling an image obtained by the image capturing device 1 upon occurrence of an event to be notified. By doing this, training for improving an ability of the user of the terminal device 3 to discover a crime or the like can be performed. And this training can prove that the user of the terminal device 3 is appropriately monitoring without looking aside. To make the false image look like the true image to level up the training, the false image may be previously subjected to the privacy protection process before being stored in a false video. Alternatively, when generating a monitoring target image on the basis of a false image extracted in the unit of frame from the false video, the privacy protection process may be performed.

Next, the process proceeds to step S110. The notification reception unit 10 determines whether or not it has received a discovery status information (which will be described later) that an event to be notified (hereinafter also referred to as "notification event"), such as a crime, has been discovered from the terminal device 3. Then, if it determines to have received the discovery status information that a notification event has been discovered (Yes), the process proceeds to step S111. On the other hand, if it determines not to have received the discovery status information that a notification event has been discovered (No), the process returns to step S101.

At step S111, the notification determination unit 11 determines whether the distribution mode set at step S102 is "false" or not. Specifically, it is determined whether or not the monitoring target image notified of the discovery (a monitoring target image transmitted to the terminal device 3 and displayed on the image display unit 17 of the terminal device 3) is an image (hereinafter also referred to as "false target image") generated on the basis of the false image. In other words, the notification determination unit 11 determines whether the monitoring target image that had been transmitted from the server apparatus 2 to the terminal device 3 when the user of the terminal device 3 determined to have discovered the notification event is a false target image or not. As the false target image (the image generated on the basis of the false image), for example, there are mentioned an image generated on the basis of only the false image or an image generated on the basis of both the true image and the false image.

Then, if the notification determination unit 11 determines that the distribution mode is "false" (Yes), it is determined that the monitoring target image used as a target of the discovery is a false target image, the process proceeds to step S112. On the other hand, if the notification determination unit 11 determines that the distribution mode is "true" (No), it is determined that the monitoring target image used as the target for the discovery is not a false target image, the process proceeds to step S113.

At step S112, the learning level setting unit 12 sets a learning level to the user of the terminal device 3 according to the number of times it has been determined at step S111 that the monitoring target image used as the target for the discovery is a false target image, that is, the number of times that the user has correctly determined that the monitoring target image is a notification event. As a method for setting the learning level of the user, for example, there can be used a method of increasing the learning level along with increase in the number of times it has been correctly determined that the monitoring target image used as the target for the discovery is a false target image. This allows the ability of the user of the terminal device 3 to discover a crime or the like to be determined on the basis of the set value of the learning level.

In addition, while the monitoring system 100 according to the first embodiment of the present invention has been described using the example in which the learning level of the user is set according to the number of times it has been correctly determined that the monitoring target image used as the target for the discovery is a false target image, other structures can also be employed. For example, the learning level may be set according to a total display time of the monitoring target image, that is, a total viewing time of the monitoring target image. In this case, for example, the learning level is set to higher as the total viewing time of the monitoring target image is longer.

Sequentially, the learning level setting unit 12 gives point(s) to the user of the terminal device 3 correctly determined that the monitoring target image displayed on the terminal device 3 is a false target image, and causes the cumulative point storage unit 15 to store a cumulative value of given points, namely, the number of cumulative points. Then, the process proceeds to step S101. Points to be given may be increased as the difficultly level of the false video used for generating the monitoring target image transmitted at step S103 is higher. The number of cumulative points may be exchangeable for, for example, various monetary rewards, such as goods, cash voucher, and digital currency.

Additionally, as a source of the monetary rewards, for example, a usage fee that is collected from the owner or manager of a monitoring target facility by the image capturing devices 1. Alternatively, for example, by posting an advertisement on the monitoring target image, an advertisement fee collected from an advertiser of the posted advertisement can be used. In addition, the number of cumulative points may be sharable with user(s) of other terminal device(s) 3.

On the other hand, at step S113, the notification operation unit 13 performs an operation (hereinafter also referred to as "external notification operation") for notifying the system administrator of the monitoring system 100 that the discovery status information that a notification event has been discovered has been received from the terminal device 3 in spite of the transmission of the true image as the monitoring target image, and then the process returns to step S101. As the external notification operation, for example, there can be used a method of outputting the notification message from an unillustrated display or speaker of the server apparatus 2. As a result, when the server apparatus 2 determines that the discovery status information that a notification event has been discovered has been received from the terminal device 3 in spite of the transmission of the true image as the monitoring target image from the server apparatus 2 to the terminal device 3, the system administrator of the monitoring system 100 can be informed that there is a possibility that an event to be notified, such as a real crime, has occurred.

Note that, while the monitoring system 100 according to the first embodiment of the present invention has been described using the example in which the system administrator of the monitoring system 100 is informed that the discovery status information that a notification event has been discovered has been received from the terminal device 3, other structures can also be employed. For example, a signal for notification may be transmitted to a terminal device (unillustrated) of the facility owner to notify the facility owner.

Figure 6:
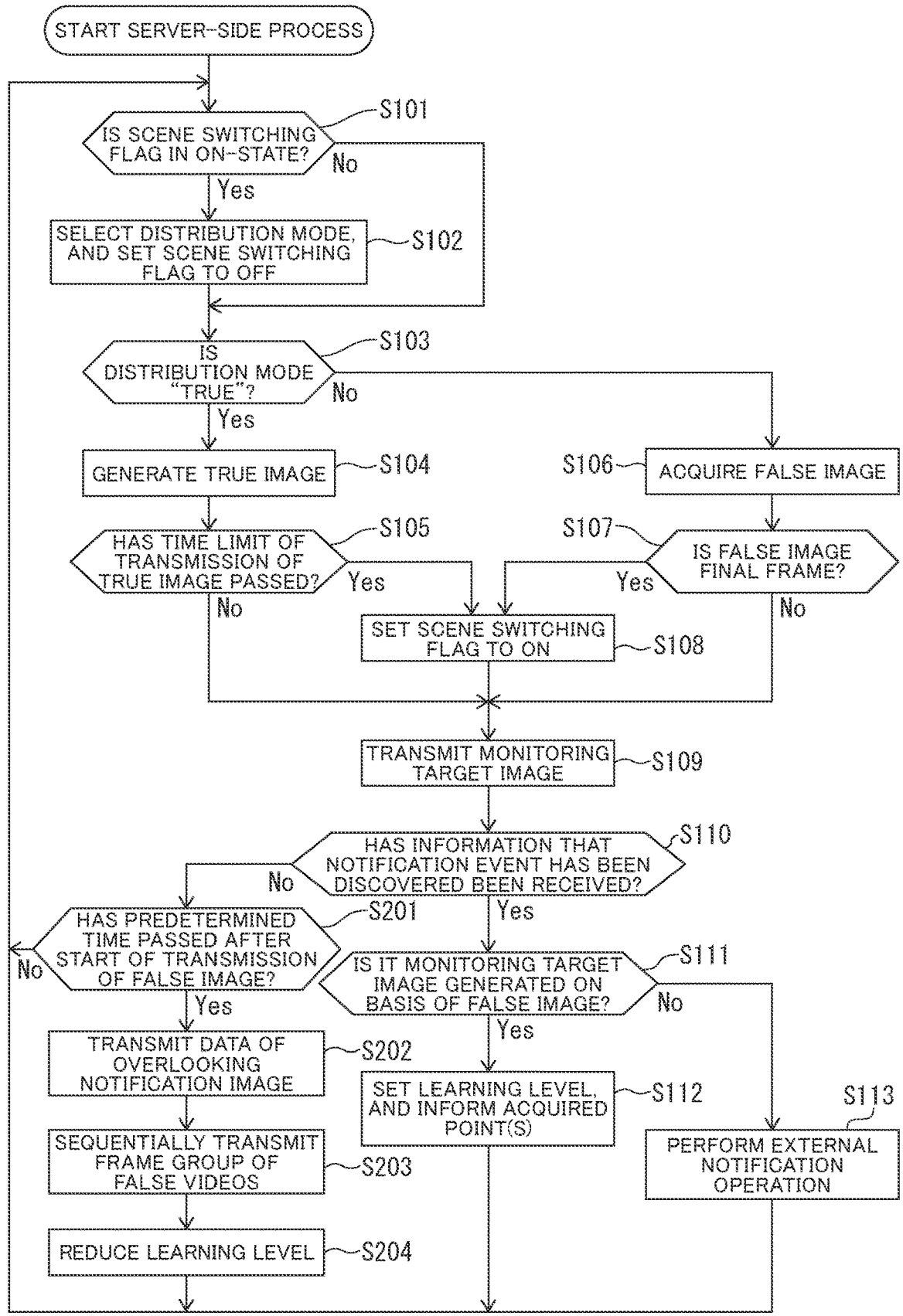
FIG. 6 is a flowchart illustrating a server-side process according to a modification.

Note that, while the monitoring system 100 according to the first embodiment of the present invention has been described using the example in which when the server apparatus 2 determines that the discovery status information that a notification event has been discovered has been received from the terminal device 3, it is determined whether or not the monitoring target image transmitted from the server apparatus 2 to the terminal device 3 is an image (false target image) generated on the basis of the false image, other structures can also be employed. For example, as illustrated in FIG. 6, if the server apparatus 2 determines that the discovery status information that a notification event has been discovered has not been received from the terminal device 3 (step S110 "No"), it is determined whether or not a predetermined designated time (for example, 80% of a recorded time of the original false video used to generate the false target image) has passed after setting the distribution mode to "false" and starting to transmit the false target image (step S201). Then, if it is determined that the predetermined time has passed (Yes), the server apparatus 2 transmits, to the terminal device 3, data of an overlooking notification image for displaying the overlooking notification image indicating that the user of the terminal device 3 has overlooked the notification event, on the image display unit 17 (step S202).

In this case, for example, frames of the false video overlooked by the user of the terminal device 3 may be transmitted in a sequential order from the first frame from the server apparatus 2 to the terminal device 3 (step S203), and the terminal device 3 may be caused to display again so as to allow the user of the terminal device 3 to view the false video again, which may help to improve the ability of the user to discover a crime or the like. Alternatively, the number of times it has been determined that the user of the terminal device 3 has overlooked an event to be notified may be accumulated, and according to the accumulated number of times, the learning level of the user having the terminal device 3 may be reduced (step S204).

(Terminal-Side Process)

Next, a description will be given of a terminal-side process that is executed by the processor 16 of the terminal device 3. The terminal-side process is executed when the user of the terminal device 3 performs a predetermined operation for starting the terminal-side process.

Figure 7:
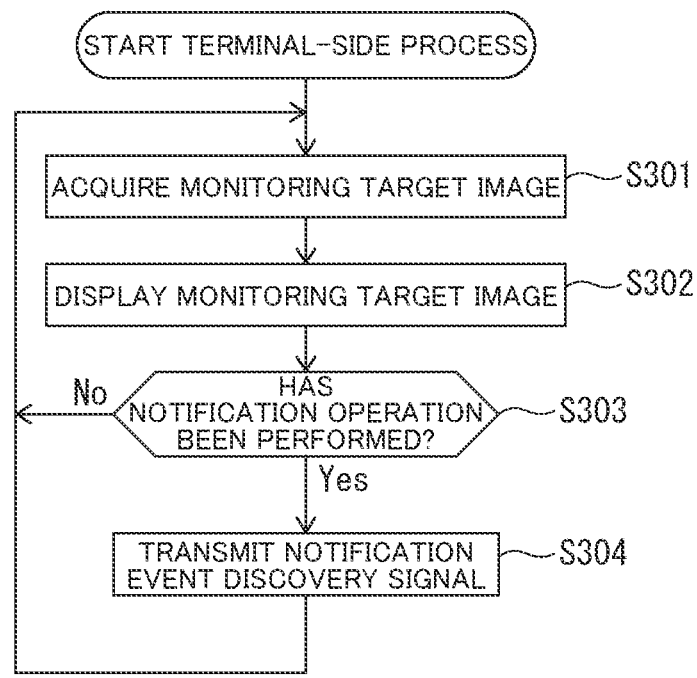
FIG. 7 is a flowchart illustrating a terminal-side process.

As illustrated in FIG. 7, first, at step S301, the monitoring target image acquisition unit 19 establishes communication between the server apparatus 2 and the terminal device 3 via the communication network 4. Next, when the server apparatus 2 starts to transmit data of the monitoring target image, the monitoring target image acquisition unit 19 acquires the transmitted data.

Subsequently, the process proceeds to step S302. The monitoring target image display unit 20 outputs a video signal for displaying the monitoring target image indicated by the data acquired at step S301 to the image display unit 17. This allows the image display unit 17 to display the monitoring target image (the true image or the false image), so that the user of the terminal device 3 can monitor a video of the monitoring target images.

Next, the process proceeds to step S303. The notification unit 21 determines whether or not the user of the terminal device 3 has performed an operation (hereinafter also referred to as "notification operation") for notifying that a notification event has been discovered. As a method for determining whether or not the notification operation has been performed, for example, the following method can be used: a notification button image is put on the image display unit 17 in such a manner as to overlap a part of the monitoring target image; then, on the basis of output from the input reception unit 18, the notification unit 21 determines whether or not the user of the terminal device 3 has touched a display position of the notification button image; and if it determines that the user has touched, the notification operation is determined to have been performed. Then, if it is determined that the notification operation has been performed (Yes), the process proceeds to step S304. On the other hand, if it is determined that the notification operation has not been performed (No), the process returns to step S301.

At step S304, the notification unit 21 transmits discovery status information notifying that the notification event has been discovered in the monitoring target image acquired at step S301 to the server apparatus 2, and then, the process returns to step S301. As a result, the user of the terminal device 3 can notify the server apparatus 2 that he or she has discovered the occurrence of the event to be notified in the monitoring target image transmitted from the server apparatus 2.

Note that, while the monitoring system 100 according to the first embodiment of the present invention has been described using the example in which if it is determined that the user of the terminal device 3 has performed the notification operation, the discovery status information notifying that a notification event has been discovered in the monitoring target image is transmitted to the server apparatus 2, other structures can also be employed. The information on the discovery of a notification event can be any information that indicates whether or not a notification event has been discovered in the monitoring target image. In other words, if it is determined that the user has not performed a notification operation, discovery status information notifying that the user has not discovered any notification event in the monitoring target image may be transmitted to the server apparatus 2. Specifically, a signal informing that no notification event has occurred continues to be constantly transmitted as a proof that the user of the terminal device 3 is appropriately monitoring without looking aside, and when the user of the terminal device 3 has performed a notification operation, the transmission of the signal is stopped.

(Operation and Others)

Next will be a description of operation of the monitoring system 100 according to the first embodiment of the present invention.

First, assume that the system administrator has performed the operation for starting the server-side process in the server apparatus 2. Then, the server apparatus 2 starts the server-side process, and determines that the scene switching flag is in the ON-state ("Yes" at step S101 of FIG. 5). Subsequently, the server apparatus 2 sets a distribution mode indicating whether to transmit a monitoring target image generated on the basis of either a true image or a false image stored in the false video storage unit 14 (step S102 of FIG. 5). Herein, assume that the distribution mode is set to "true", and the server apparatus 2 determines that the distribution mode is "true" ("Yes" at step S103 of FIG. 5).

Next, the server apparatus 2 acquires a latest captured image data output from the image capturing device 1, namely, a current image thereof, and generates, as a true image, an image obtained by subjecting the acquired current image to the privacy protection process that makes it difficult to identify a person in the current image (step S104 of FIG. 5). Subsequently, the server apparatus 2 determines that the time limit of transmission of the true image has not passed from start of transmission of the true image as a monitoring target image ("No" at step S105 of FIG. 5), generates a monitoring target image on the basis of the true image (for example, the true image itself is used as a monitoring target image), and transmits data of the generated monitoring target image to the terminal device 3 (step S109 of FIG. 5).

Next, the server apparatus 2 determines not to have received discovery status information that a notification event has been discovered from the terminal device 3 ("No" at step S110 of FIG. 5). Then, the server apparatus 2 repeats the above-described flow to generate, one after another, a true image obtained by subjecting a new current image to the privacy protection process, and transmits, one after another, data of a monitoring target image generated on the basis of the true image to the terminal device 3.

On the other hand, at step S102 of FIG. 5, if the distribution mode is set to "false" (if there are a plurality of false videos, one false video is selected at this timing), it is determined at step S103 of FIG. 5 that the distribution mode is not "true" ("No" at step S103 of FIG. 5). Subsequently, the server apparatus 2 acquires the first frame of the false video as a false image (step S106 of FIG. 5), and determines that the acquired false image is not the final frame of the false video ("No" at step S107 of FIG. 5). Next, the server apparatus 2 generates a monitoring target image on the basis of the acquired false image (for example, the false image itself is used as a monitoring target image), and transmits data of the generated monitoring target image to the terminal device 3 (step S109 of FIG. 5).

Next, the server apparatus 2 determines that the discovery status information that a notification event has been discovered has not been received from the terminal device 3 ("No" at step S110 of FIG. 5). Then, the server apparatus 2 repeats the above-described flow to acquire, as a false image, a next frame of a selected false video one after another, and transmits, one after another, data of a monitoring target image generated on the basis of the acquired false image.

Assume that the user of the terminal device 3 has performed the operation for starting the terminal-side process in the terminal device 3. Then, the terminal device 3 establishes communication with the server apparatus 2, whereby when the server apparatus 2 starts to transmit the data of the monitoring target image, the terminal device 3 acquires the transmitted data (step S301 of FIG. 7). Next, a video signal for displaying the monitoring target image indicated by the acquired data is output to the image display unit 17 (step S302 of FIG. 7). Then, the image display unit 17 displays the monitoring target image.

Subsequently, the terminal device 3 determines that the user of the terminal device 3 has not performed a notification operation ("No" at step S303 of FIG. 7), repeats the above-described flow, and causes the image display unit 17 to display, one after another, monitoring target images of the data transmitted from the server apparatus 2. By doing this, a video comprising true images of a plurality of continuous frames or a video comprising false images of a plurality of continuous frames is displayed on the image display unit 17 to allow the user of the terminal device 3 to monitor the true images or the false images.

Here, assume that the server apparatus 2 has generated a monitoring target image (a false target image) on the basis of the false video, and has transmitted data of the generated monitoring target image one after another to the terminal device 3 (step S109 of FIG. 5), and the terminal device 3 has displayed the false target images transmitted from the server apparatus 2 (step S302 of FIG. 7). Then, assume that the user of the terminal device 3 has noticed that the false image, namely, an image indicating the occurrence of a notification event is being displayed, and has performed a notification operation in the input reception unit 18 of the terminal device 3. The terminal device 3 determines that the user of the terminal device 3 has performed the notification operation ("Yes" at step S303 of FIG. 7), and transmits discovery status information that the notification event has been discovered to the server apparatus 2 (step S304 of FIG. 7).

When the discovery status information is transmitted to the server apparatus 2, the server apparatus 2 determines that it has received the discovery status information that the notification event has been discovered ("Yes" at step S110 of FIG. 5). Next, the server apparatus 2 determines that the distribution mode is "false", and determines that the monitoring target image transmitted from the server apparatus 2 to the terminal device 3 is the false image ("Yes" at step S111). As a result, the server apparatus 2 determines that the user of the terminal device 3 is appropriately monitoring the monitoring target image. Sequentially, the server apparatus 2 sets a learning level for the user of the terminal device 3, and gives point(s) to the user. Then, to notify the user that the task of transmitting discovery status information that a notification event has been discovered has been properly handled, the server apparatus 2 overwrites the given point(s) and the number of cumulative points on the monitoring target image, and transmits to the terminal device 3 (step S112 of FIG. 5).

On the other hand, assume that the server apparatus 2 has generated a monitoring target image on the basis of the true image, and has transmitted data of the generated monitoring target image one after another to the terminal device 3 (step S109 of FIG. 5), and the terminal device 3 has displayed the true target images transmitted one after another from the server apparatus 2 (step S302 of FIG. 7). Here, assume that a real crime or the like has occurred in a predetermined space of a facility being captured by the image capturing devices 1. Additionally, assume that the user of the terminal device 3 has noticed that a true image of the real crime or the like, namely, an image indicating the occurrence of the notification event is being displayed, and has performed a notification operation in the input reception unit 18 of the terminal device 3. Then, the terminal device 3 determines that the user of the terminal device 3 has performed the notification operation ("Yes" at step S303 of FIG. 7), and transmits the discovery status information that a notification event has been discovered to the server apparatus 2 (step S304 of FIG. 7).

When the discovery status information is transmitted to the server apparatus 2, the server apparatus 2 determines that it has received the discovery status information that a notification event has been discovered ("Yes" at step S110 of FIG. 5). Subsequently, the server apparatus 2 determines that the distribution mode is "true", and determines that the monitoring target image transmitted from the server apparatus 2 to the terminal device 3 is not a false image but a true image ("No" at step S111 of FIG. 5). Next, the server apparatus 2 performs the external notification operation for notifying the system administrator of the monitoring system 100 that in spite of the transmission of the true image, the discovery status information that a notification event has been discovered has been received from the terminal device 3 (step S113 of FIG. 5).

As described hereinabove, the monitoring system 100 according to the first embodiment of the present invention includes the server apparatus 2 and the plurality of image capturing devices 1 configured to capture an image of a predetermined space to be monitored. Additionally, the server apparatus 2 includes the current image acquisition unit 7 configured to acquire, as a current image, a latest captured image by at least one of the image capturing devices 1, the true image generation unit 8 configured to generate, as a true image, an image obtained by subjecting the acquired current image to a privacy protection process that makes it difficult to identify a person in the current image, the false video storage unit 14 configured to store a video, a still image, or information for generating the still image, the false video storage unit 14 being capable of extracting one frame of the video or the still image as a false image for use in determining whether or not a monitoring is being appropriately performed by a monitoring person, the image transmission unit 9 configured to transmit, to the terminal device 3, a monitoring target image generated on the basis of either the generated true image or the stored false image, or a monitoring target image generated on the basis of both the true image and the false image, the notification reception unit 10 configured to receive, as discovery status information, whether or not a user of the terminal device 3 has discovered a notification event in the monitoring target image, and the notification determination unit 11 configured to, upon receipt of the discovery status information that a notification event has been discovered from the terminal device 3, determine whether or not the monitoring target image used as the target for the discovery is an image generated on a basis of only the false image or an image generated on a basis of both the true image and the false image, namely, a false image.

In other words, the monitoring system 100 is configured such that the monitoring target image received from the server apparatus 2 is displayed on the terminal device 3, and when the user of the terminal device 3 discovers a notification event in the monitoring target image, the user transmits discovery status information that a notification event has been discovered to the server apparatus 2. The monitoring target image is an image generated on the basis of either a true image or a false image, or an image generated on the basis of both of the true image and the false image. The true image is an image obtained by using, as a current image, a latest image of a predetermined space to be monitored captured by at least one of the image capturing devices 1 and then subjecting the current image to a privacy protection process that makes it difficult to identify a person in the current image. The false image is an image for use in determining whether or not a monitoring is being appropriately performed by a monitoring person, which image is an image extracted in the unit of frame from a video or a still image. The false video is made to look like the true image by previously subjecting the false video to the privacy protection process before storing or by performing the privacy protection process when generating a monitoring target image on the basis of the false image extracted in units of frames from the false video. Additionally, when the transmitted discovery status information is information that a notification event has been discovered, it is determined whether the monitoring target image used as the target for the discovery is an image generated on the basis of only the false image or an image generated on the basis of both the true image and the false image, namely, a false image.

As a result, for example, if the monitoring target image based on the false image has been transmitted when the discovery status information that a notification event has been discovered is received from the terminal device 3, it can be determined that monitoring has been appropriately performed. Additionally, when detecting a situation in which although the monitoring target image based on the false image has been transmitted, the discovery status information that a notification event has been discovered is not received from the terminal device 3, it can be determined that monitoring has not been appropriately performed. Thus, there can be provided the monitoring system 100 capable of determining whether or not a monitoring is being appropriately performed on the terminal device 3 side.

Additionally, in the monitoring system 100 according to the first embodiment of the present invention, not only a true image but also a false image is transmitted. Here, since the true image is one subjected to the privacy protection process that makes it difficult to identify a person, information therein is less than in the original image. Due to that, it is difficult for an ordinary person to determine by watching the true image whether or not an event to be notified has occurred. It is also difficult for an ordinary person who is not a surveillance professional to maintain concentration. On the other hand, the monitoring system 100 according to the first embodiment of the invention allows the user of the terminal device 3 to watch the false image subjected to the privacy protection process for protecting privacy, similarly to the true image, that is, an image resembling an image obtained by at least one of the image capturing devices 1 upon occurrence of an event to be notified. This enables execution of training for improving the ability of the user of the terminal device 3 to discover a crime or the like, as well as it can be taken as a proof that, surely right now, the user of the terminal device 3 is appropriately monitoring without looking aside.

In the early days of automatic security systems, there was a problem that human sensors and vibration sensors erroneously notified entry of a small animal or shaking of a shutter by wind, as intrusion of a suspicious person, and then a security company concerned easily reported to police every time an erroneous notification was made. To solve such a problem, the Security Services Act was amended in 1982, and the qualification of automatic security system manager was institutionalized. Additionally, a qualification examination for security guards was set up, and "viewpoints and considerations for patrolling through video footages" were incorporated in the practical skills test of the qualification examination.

Accordingly, it is desirable to train security guards having sufficient monitoring skills. However, security guards are required to cover other skills besides monitoring, due to which there is a limit in training only during working hours.

On the other hand, the monitoring system 100 according to the first embodiment of the present invention can improve monitoring accuracy and improve monitoring skills of security guards so as not to easily report to the police by using the monitoring system 100 in security guard training as well as securing sufficient numbers of security guards specializing in camera surveillance.

In addition, the server apparatus 2 includes the learning level setting unit 12 configured to set a learning level for the user of the terminal device 3 according to the number of times it has been correctly determined that the monitoring target image is an image generated on the basis of the false image. This allows determination on the ability of the user of the terminal device 3 to discover a crime or the like, and confirmation on an actual result of the user of the terminal device 3 who has appropriately monitored.

Furthermore, the false video storage unit 14 stores a plurality of false videos having different difficultly levels, and when the image transmission unit 9 transmits a monitoring target image generated on the basis of a false video, it transmits to the terminal device 3 a monitoring target image generated on the basis of a false video having a difficulty level in accordance with the learning level of the user of the terminal device 3. This allows for further improvement in the ability of the user of the terminal device 3 to discover a crime or the like, so that the user of the terminal device 3 can more appropriately perform monitoring.

Additionally, the server apparatus 2 includes the notification operation unit 13 configured to perform the external notification operation for notifying that the discovery status information that a notification event has been discovered has been received from the terminal device 3 when the notification determination unit 11 determines that the monitoring target image is not an image generated on the basis of the false image (only the true image has been transmitted). By doing this, when a real event to be notified occurs in a predetermined space to be monitored, the occurrence thereof can be promptly and easily notified to the system administrator.

Second Embodiment

Figure 8:
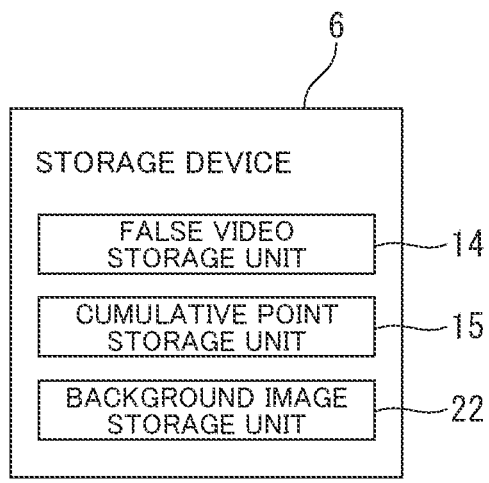
FIG. 8 is a conceptual diagram illustrating the structure of a monitoring system according to a second embodiment of the present invention.
Figure 9:
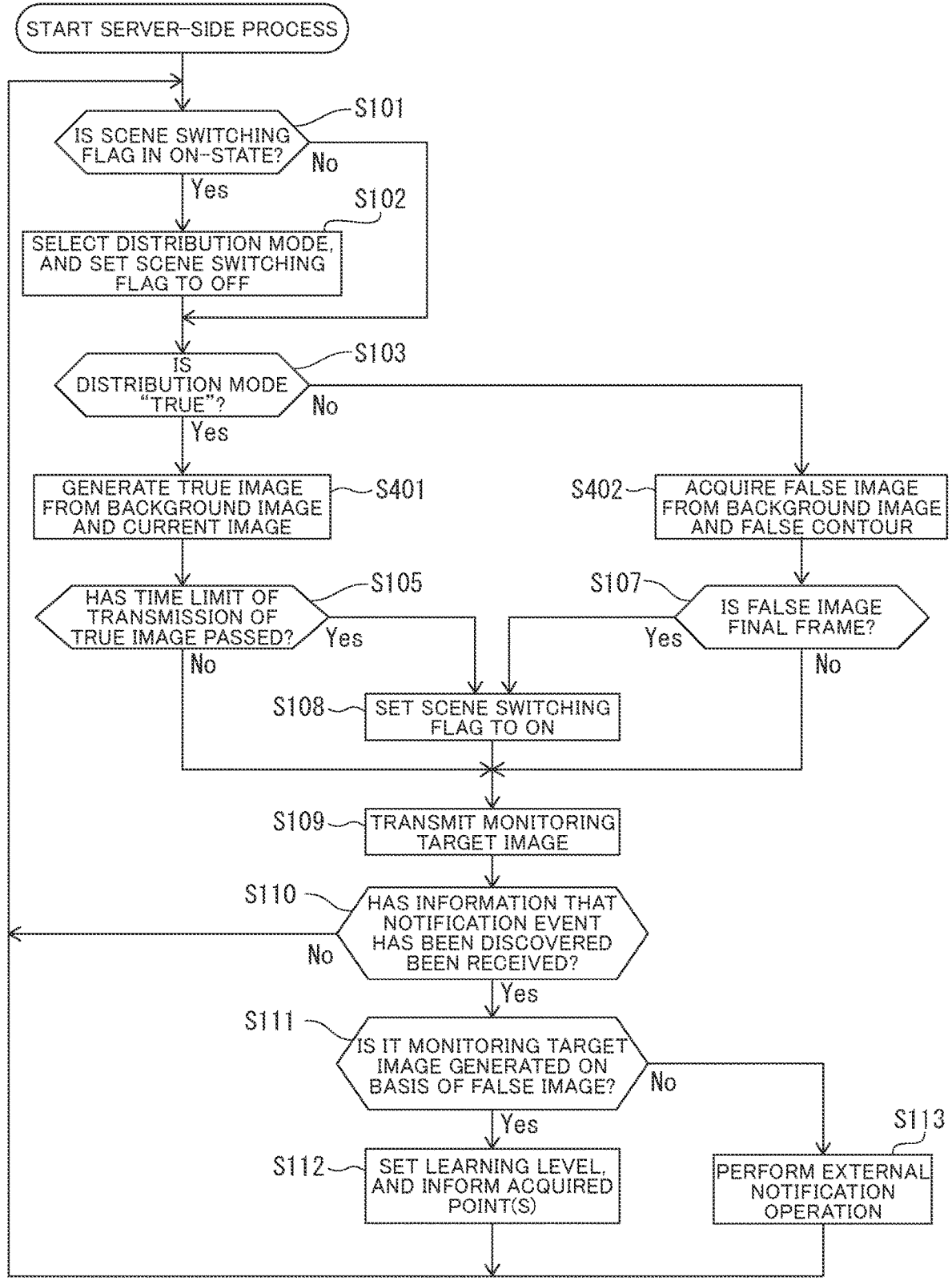
FIG. 9 is a flowchart illustrating a server-side process.

A second embodiment is different from the first embodiment in that the storage device 6 of the server apparatus 2 includes a background image storage unit 22, as illustrated in FIG. 8; step S401 is included instead of step S104 of FIG. 5; and, step S402 is included instead of step S103 of FIG. 5, as illustrated in FIG. 9.

The background image storage unit 22 stores, as a background image, at least one of the images captured by at least one of the image capturing devices 1. As the background image, for example, a frame in which no face image is detected can be used. Alternatively, for example, the system administrator or a facility owner may be allowed to perform an operation for selecting a background image, and one of images selected by the system administrator or the facility owner through the operation may be used as a background image. When the latter method is employed, it is assured by the system administrator or the facility owner that the image never violates privacy, so that, for example, it is permissible that a famous clerk of a facility (a store) is reflected in the background image. Thus, the background image is not necessarily limited to one in which no person is reflected.

Furthermore, for example, it is also possible to use a method in which it is determined whether a pixel value of sequential captured images has changed over a predetermined time, and if it is determined that the pixel values of all the pixels at the same coordinates have not changed, one image of them is stored as a background image.

The false video storage unit 14 stores false images composing contours (hereinafter also referred to as "false contour") extracted from a foreground image of each frame forming the false video. The contour is a coordinate groups of pixels whose brightness values or the like more drastically change than those of surrounding pixels. Alternatively, the false video storage unit 14 may store, together with the false image, data related to a distance between a person indicated by the false contour and the image capturing device 1. The false video storage unit 14 may store, as the data of the distance, a distance between the image capturing device that has captured the false video and the person indicated by the false contour. Alternatively, when generating a false video using computer graphics or the like, the false video storage unit 14 may calculate and store a distance from a computational visual point to the person indicated by the false contour as the data of the distance.

At step S401, the true image generation unit 8 cuts out the foreground image on the basis of a difference between the background image stored in the background image storage unit 22 and the current image acquired at step S101. Next, the true image generation unit 8 extracts the contour of the cut-out foreground image and overwrites the extracted contour on the background image to generate a true image. In other words, the true image generation unit 8 extracts the contour of the foreground image cut out from the current image on the basis of the difference between the background image and the current image, and overwrites the extracted contour on the background image to generate the true image. As the contour of the foreground image, for example, one extracted on the basis of a brightness value can be used. Alternatively, for example, there can be used a contour obtained by extracting respective contours of three primary colors of R (red), G(green), and B(blue) and synthesizing (merging) the extracted three contours into one. As an algorithm for extracting the contour, for example, the Canny method proposed by John Canny in 1986 can be used.

At step S402, the image transmission unit 9 reads a false contour corresponding to one frame of the false video selected at step S102 from the false video storage unit 14, and overwrites the read false contour image on the background image stored in the background image storage unit 22 to generate a transmission false image. Specifically, first, a false contour corresponding to a first frame of the false video is overwritten on the background image to generate a transmission false image, and then, every time when this step is executed, a false contour corresponding to a next frame of the false contour previously overwritten on the background image is overwritten on the background image to generate a transmission false image.

Note that while the monitoring system 100 according to the second embodiment of the present invention has been described using the example in which the server apparatus 2 performs the synthesis between the contour of the foreground image of the current image and the background image and the synthesis between the false contour and the background image, other structures can also be employed. For example, the terminal device 3 may perform these syntheses. In this case, the background image does not change, and accordingly, it is sufficient to transmit it to the terminal device 3 only once, and transmit only contour data one after another, thereby enabling reduction in the amount of communication. The background image is retransmitted every time the predetermined space to be monitored is switched (when the scene switching flag is in the ON-state).

As described hereinabove, the monitoring system 100 according to the second embodiment of the present invention includes the background image storage unit 22 configured to store one image captured by at least one of the image capturing devices 1 as a background image. The true image generation unit 8 extracts the contour of the foreground image cut out from the current image on the basis of the difference between the background image and the current image, and overwrites the extracted contour on the background image to generate a true image. The false video storage unit 14 stores the false contour that is the contour extracted from the foreground image cut out for each frame from the false video. The image transmission unit 9 transmits, as a monitoring target image, an image generated (for example, by cutting out a part of the false image to be transmitted and overwriting the part on the same position of the true image) on the basis of either the true image generated by the true image generation unit 8 or the transmission false image obtained by overwriting the false contour stored in the false video storage unit 14 on the background image, or both thereof. Thus, for example, cost of false video production can be reduced as compared to a method of producing a false video by previously capturing images in a predetermined space of a monitoring target facility. Additionally, for example, the storage capacity of the false video storage unit 14 can be reduced as compared to a method in which a foreground image extracted by a chroma key technology, namely, a color image, is kept stored as a false video in the false video storage unit 14, and then the color image kept stored in the false video storage unit 14 is overwritten on a background image. Furthermore, the privacy of a person in the predetermined space of the facility can be more surely protected. An alternative structure may be employed where a foreground image extracted by the chroma key technology is kept stored in the false video storage unit 14, and then the contour thereof is extracted at the stage of generation of a transmission false image. In this case, although the storage capacity of the false video storage unit 14 is not reduced, the amount of communication to the terminal device 3 can be reduced.

(Modifications)

Note that while the monitoring system 100 according to the second embodiment of the present invention has been described using the example in which a transmission false image is generated from the false contour and the background image, other structures can also be employed. For example, a transmission false image may be generated from the false contour and the true image. Specifically, the false contour stored in the false video storage unit 14 is overwritten on the true image generated by the true image generation unit 8 to generate a transmission false image. In this case, for example, the false contour may be overwritten on a region of the true image where the contour of the foreground image of the current image is not present. Alternatively, for example, the false contour may be mask processed by using a mask image obtained by inverting a mask image generated from the difference between the current image and the background image when extracting the foreground, and then, the mask-processed false contour may be overwritten on the true image. By doing this, a part of the false contour corresponding to a pixel region of the foreground image of the true image can be cut out and deleted. As a result, a false image with high reality can be generated such that the false contour passes behind the contour of the foreground image of the true image.

Furthermore, for example, a mask image (hereinafter also referred to as "false foreground mask") for cutting out the foreground used to extract the false contour may be kept stored, together with the false contour, in the false video storage unit 14; the contour of the true image may be mask processed by using a mask image obtained by inverting the false foreground mask stored in the false video storage unit 14; the mask-processed contour may be overwritten on the background image to generate a true image; and the false contour stored in the false video storage unit 14 may be overwritten on the generated true image. By doing this, a part of the contour of the true image corresponding to a pixel region of the foreground image of the false image can be cut out and deleted. As a result, a false image with high reality can be generated such that the contour of the true image passes behind the false contour.

In this case, if a comparison in size between the foreground image of the true image and the foreground image of the false image indicates that the foreground image of the true image is larger than the foreground image of the false image, the false contour may be configured to pass behind the contour of the foreground image of the true image. In addition, if the foreground image of the true image is smaller than the foreground image of the false image, the contour of the foreground image of the true image may be configured to pass behind the false contour.

An alternative structure may be employed where the data of the distance between the person indicated by the false contour and the image capturing device 1 is kept stored in a distance detection unit (unillustrated), and when the image capturing device 1 is mounted with a stereo camera or a distance sensor so that the distance between the person indicated by the contour of the true image and the image capturing device 1 can be measured, a relationship between the two distances may be used to determine which one of the contours passes behind the other contour.

Third Embodiment

Figure 10:
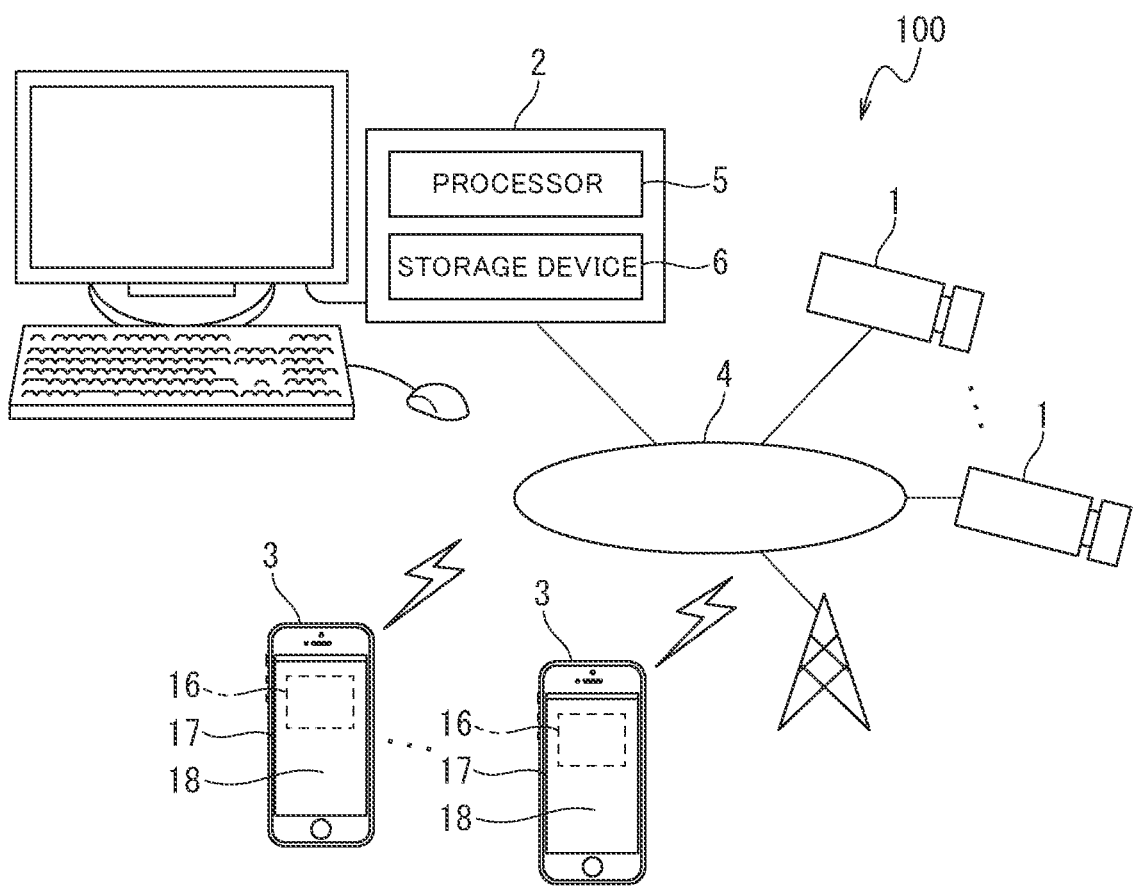
FIG. 10 is a conceptual diagram illustrating the structure of a monitoring system according to a third embodiment of the present invention.
Figure 11:
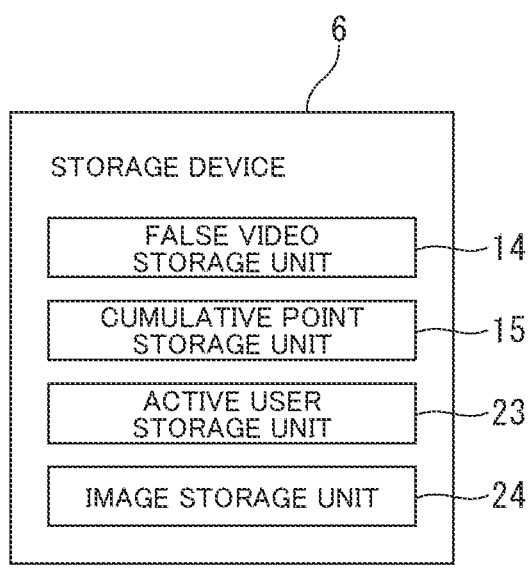
FIG. 11 is a block diagram illustrating an internal structure of the storage device of the server apparatus.
Figure 12:
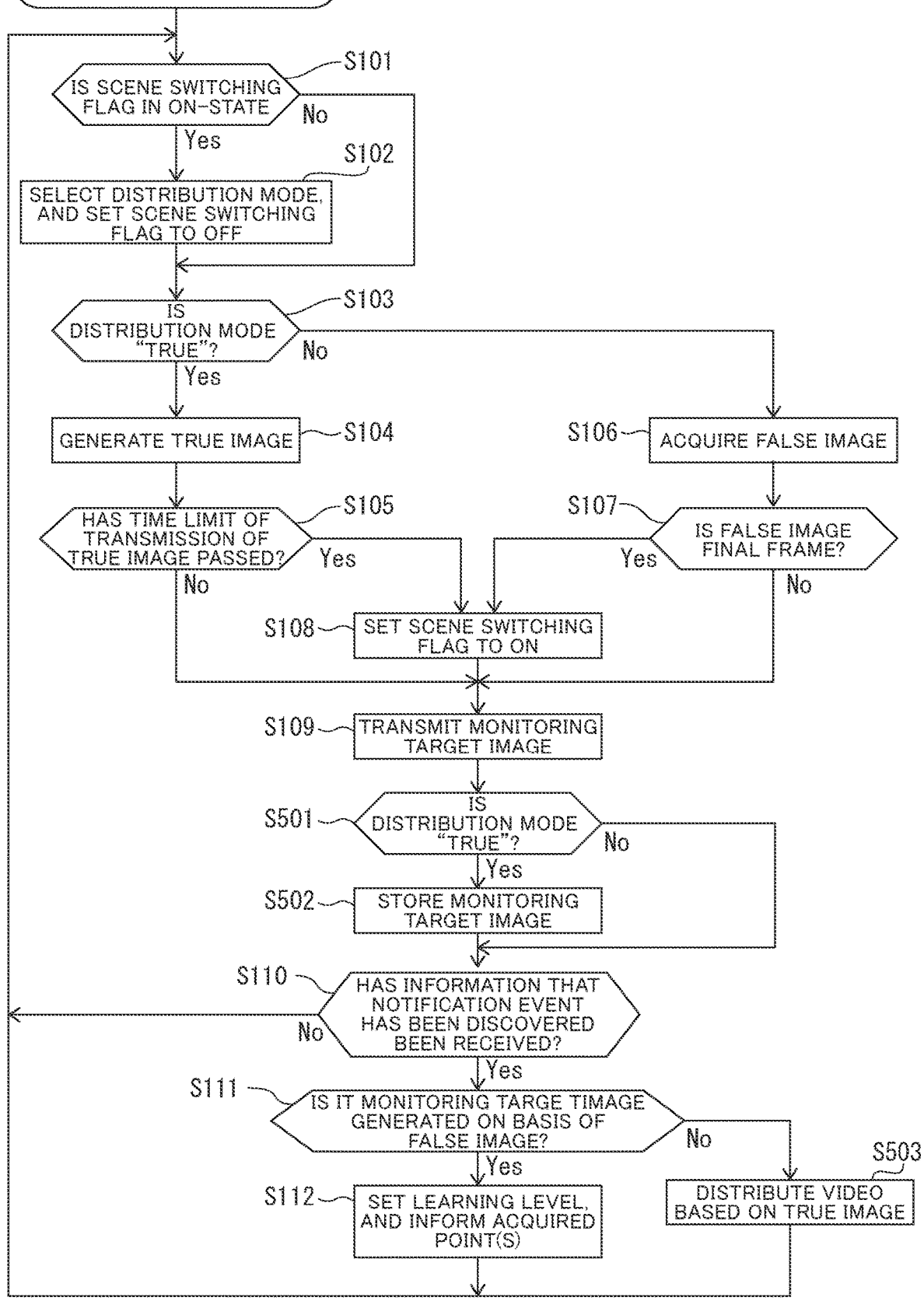
FIG. 12 is a flowchart illustrating a server-side process.

A third embodiment is different from the first embodiment in that a plurality of terminal devices 3 are included, as illustrated in FIG. 10; the storage device 6 of the server apparatus 2 includes an active user storage unit 23 and an image storage unit 24, as illustrated in FIG. 11; and steps S501 and S502 are included between steps S109 and S110 of FIG. 5, and step S503 is included instead of step S113, as illustrated in FIG. 12.

The active user storage unit 23 stores data (hereinafter also referred to as "terminal specifying data") for specifying the terminal device 3 that is executing the terminal-side process, namely, an active user.

The image storage unit 24 subsequently stores true images generated by the true image generation unit 8 to form one video file, as will be described later. The video file is adjusted such that when the amount of data exceeds a predetermined designated time (for example, two minutes) upon addition of a true image as a latest frame, data of an oldest frame is discarded so that it is a video file constantly no longer than the predetermined time.

At step S501, the image transmission unit 9 determines whether the distribution mode set at step S102 is "true" or not. In other words, it is determined whether the monitoring target image transmitted at step S109 is not an image generated on the basis of the false image (whether an image generated on the basis of only the true image has been transmitted). Then, if the image transmission unit 9 determines that it is "true" (Yes), it is determined that an image generated on the basis of only the true image has been transmitted, and the process proceeds to step S502. On the other hand, if the image transmission unit 9 determines that it is "false" (No), it is determined that the monitoring target image transmitted at step S109 is an image generated on the basis of the false image, and the process proceeds to step S110.

At step S502, the image transmission unit 9 causes the image storage unit 24 to store the true image transmitted as the monitoring target image at step S109, and then, the process proceeds to step S110.

At step S503, as a verification of authenticity by a third person for determining whether or not to perform the above-described external notification operation, the notification operation unit 13 specifies, of the terminal devices 3 specified by the terminal specifying data stored in the active user storage unit 23, a terminal device 3 (hereinafter also referred to as "confirmation terminal device 3") other than a terminal device 3 (hereinafter also referred to as "target terminal device 3") that has transmitted discovery status information that a notification event has been discovered. As for the confirmation terminal device 3, a user having a higher learning level than the target terminal device 3 may be specified. Next, the video file of the true image stored in the image storage unit 24 is transmitted one after another, from a first frame thereof, to the specified confirmation terminal device 3. Then, after ending transmission of all the frames, the process returns to step S101. Specifically, a plurality of true images are transmitted that are continuous retroactively from the true image transmitted as the monitoring target image. As a result, when the discovery status information that a notification event has been discovered is received from the target terminal device 3 in spite of distribution of the true image-based video, the same true image-based video can be confirmed by the user of the confirmation terminal device 3, as the verification of authenticity by a third person.

In that case, if the user of the confirmation terminal device 3 has not transmitted a notification that an event to be notified is reflected, namely, discovery status information that a notification event has been discovered, the discovery status information that a notification event has been discovered transmitted from the target terminal device 3 is an erroneous notification. Thus, the learning level of the user of the target terminal device 3 may be reduced. Additionally, to clarify whether the user of the confirmation terminal device 3 has seen or not seen, there may be provided a mechanism that causes the user of the confirmation terminal device 3 to notify that the event to be notified has not been reflected. On the other hand, if the discovery status information that an event to be notified has been discovered has been transmitted also from the user of the confirmation terminal device 3, the notification operation unit 13 performs the above-described external notification operation. Note that if it turns out at a later date that a real event to be notified has actually occurred, a special reward may be given to the user of the target terminal device 3. In addition, it may be structured that the user of the confirmation terminal device 3 is informed that this is the verification of authenticity by a third person, and if the user cannot discover any notification event, he or she must transmit discovery status information that there is no occurrence of a notification event.

As described hereinabove, in the monitoring system 100 according to the third embodiment of the present invention, if the monitoring target image is determined not to be an image generated on the basis of the false image (only the true image has been transmitted), the notification operation unit 13 transmits a plurality of true images continuous retroactively from the true image transmitted as the monitoring target image to the target terminal device 3 to the terminal device 3 (the confirmation terminal device 3) different from the terminal device 3 (the target terminal device 3) that has transmitted the discovery status information that a notification event has been discovered, as the verification of authenticity by a third person. Here, since the true image is one subjected to the privacy protection process that makes it difficult to identify a person, information therein is less than the original current image. Due to that, it is difficult for an ordinary person to determine from the true image whether or not an event to be notified, such as a crime, has occurred. On the other hand, the monitoring system 100 according to the third embodiment of the present invention allows the user of the confirmation terminal device 3 to confirm the video file of the true image notified by the user of the target terminal device 3, as the verification of authenticity by a third person. Thus, it can be more surely determined whether an event to be notified has occurred or not.

Note that, in the monitoring system 100 according to the third embodiment of the present, a true image itself is used as a monitoring target image, and transmitting a plurality of true images to the confirmation terminal device 3 means, in other words, to transmit a plurality of monitoring target images to the confirmation terminal device 3. When using a true image to generate a monitoring target image different from the true image, it may be structured that instead of transmitting a plurality of monitoring target images to the confirmation terminal device 3, a plurality of true images used to generate the plurality of monitoring target images may be transmitted to the confirmation terminal device 3.

Fourth Embodiment

Figure 13:
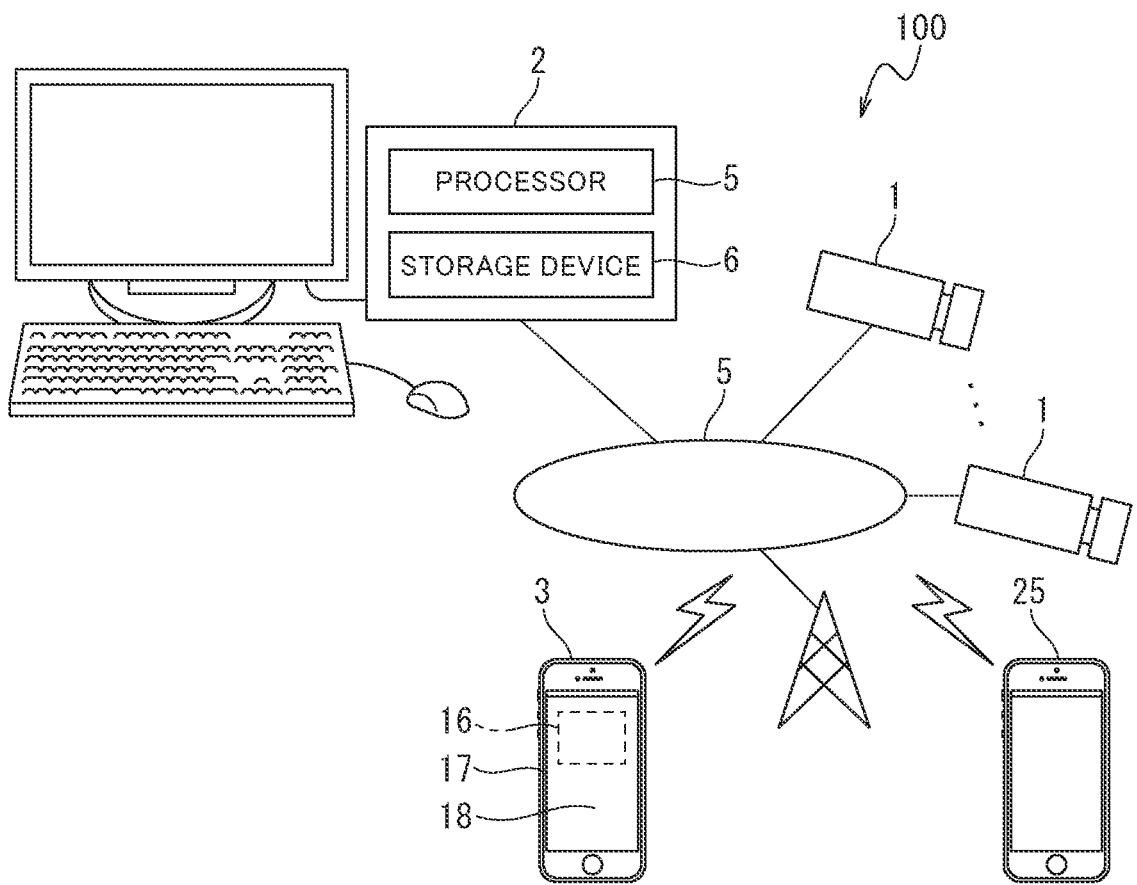
FIG. 13 is a conceptual diagram illustrating the structure of a monitoring system according to a fourth embodiment of the present invention.
Figure 14:
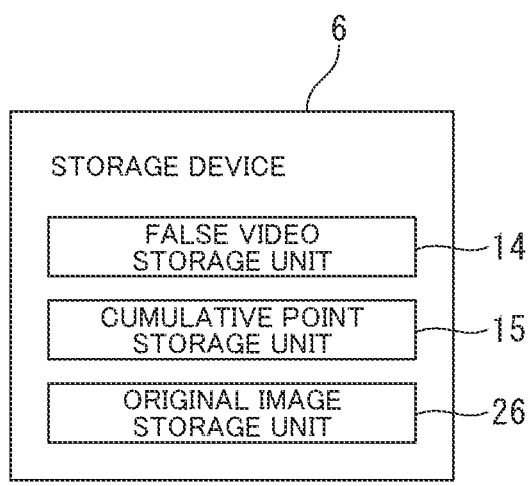
FIG. 14 is a block diagram illustrating an internal structure of the storage device of the server apparatus.
Figure 15:
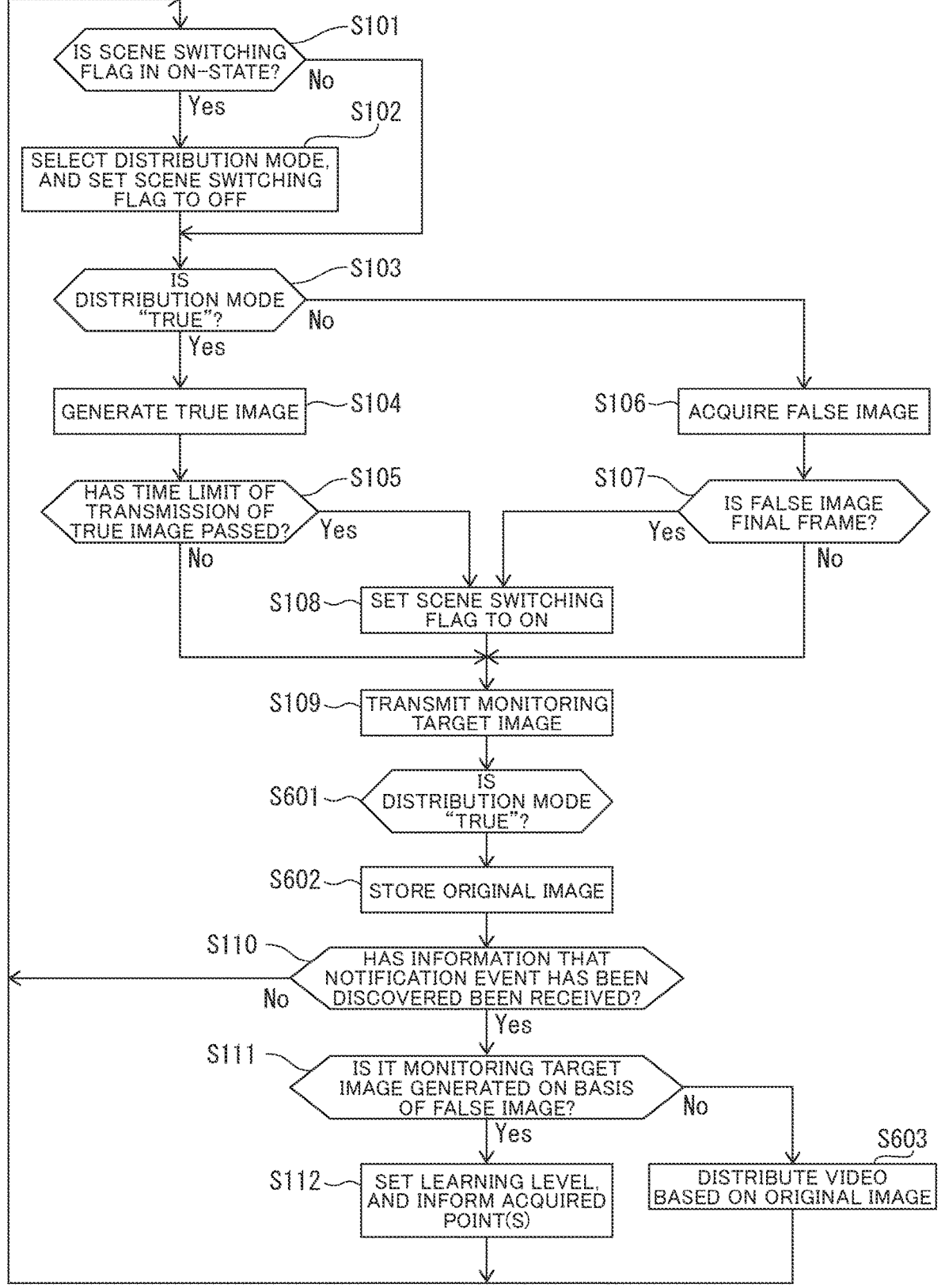
FIG. 15 is a flowchart illustrating a server-side process.

A fourth embodiment is different from the first embodiment in that a terminal device 25 of a surveillance specialist or a facility owner is included, as illustrated in FIG. 13; the storage device 6 of the server apparatus 2 includes an original image storage unit 26, as illustrated in FIG. 14; and steps S601 and S602 are included between steps S109 and S110 of FIG. 5, and step S603 is included instead of step S113 of FIG. 5, as illustrated in FIG. 15.

The terminal device 25 can transmit and receive various data to and from the server apparatus 2 via the communication network 4. Additionally, the terminal device 25 can receive and display image data from the server apparatus 2. As the terminal device 25, for example, a smartphone similar to the terminal device 3 can be used.

As will be described later, the original image storage unit 26 sequentially stores current images as original images to form one video file. The video file is controlled such that when the amount of data exceeds a predetermined designated time (for example, two minutes) upon addition of a current image as a latest frame, data of an oldest frame is discarded so that it is a video file constantly no longer than the predetermined time.

At step S601, the image transmission unit 9 determines whether the distribution mode set at step S102 is "true" or not. In other words, it is determined whether the monitoring target image transmitted at step S109 is not an image generated on the basis of the false image (whether only the true image has been transmitted). Then, if the image transmission unit 9 determines that it is "true" (Yes), it is determined that the true image has been transmitted, and the process proceeds to step S602. On the other hand, if the image transmission unit 9 determines that it is "false" (No), it is determined that the monitoring target image is an image generated on the basis of the false image, and the process proceeds to step S110.

At step S602, the image transmission unit 9 causes the original image storage unit 26 to store the current image acquired at step S104 as the original image, and then, the process proceeds to step S110.

At step S603, as a new external notification operation as an alternative to the above-described external notification operation, the notification operation unit 13 transmits to the terminal device 25 the video file of the original image, one after another from a first frame thereof, used for generation of the true image transmitted as the monitoring target image to the terminal device 3 (the target terminal device 3) that has transmitted the discovery status information that a notification event has been discovered. After ending transmission of all the frames, the process returns to step S101. Specifically, a plurality of original images (current images) are transmitted that are continuous retroactively from the original image (current image) used for generation of the true image transmitted as the monitoring target image. As a result, when the discovery status information that a notification event has been discovered is received from the target terminal device 3 in spite of distribution of the true image-based video, the original image used for generation of the true image can be confirmed by the surveillance specialist or the facility owner having the terminal device 25.

In that case, if a reply that the event to be notified has not been reflected is received from the surveillance specialist or the facility owner, the discovery status information that a notification event has been discovered transmitted from the target terminal device 3 is an erroneous notification. Thus, the learning level of the user of the target terminal device 3 may be reduced. On the other hand, if it turns out at a later date that a real event to be notified, such as a crime, has actually occurred, a special reward may be given to the user of the target terminal device 3.

As described hereinabove, in the monitoring system 100 according to the fourth embodiment of the present invention, if the notification operation unit 13 determines at step S111 that the monitoring target image is not an image generated on the basis of the false image (only the true image has been transmitted), it performs the following external notification operation. The notification operation unit 13 transmits to a predetermined specific terminal device 25 a plurality of original images (current images) continuous retroactively from the original image (current image) used for generation of the true image transmitted as the monitoring target image to the terminal device 3 that has transmitted the discovery status information that a notification event has been discovered. Here, since the true image is one subjected to the privacy protection process that makes it difficult to identify a person, information therein is less than in the original current image. Due to that, it is difficult for an ordinary person to determine from the true image whether or not an event to be notified, such as a crime, has occurred. On the other hand, the monitoring system 100 according to the fourth embodiment of the present invention allows the surveillance specialist or the facility owner who is the user of the terminal device 25 to confirm the image data before being subjected to the privacy protection process, so that it can be more surely determined whether a notification target event has occurred or not.

Fifth Embodiment

Figure 16:
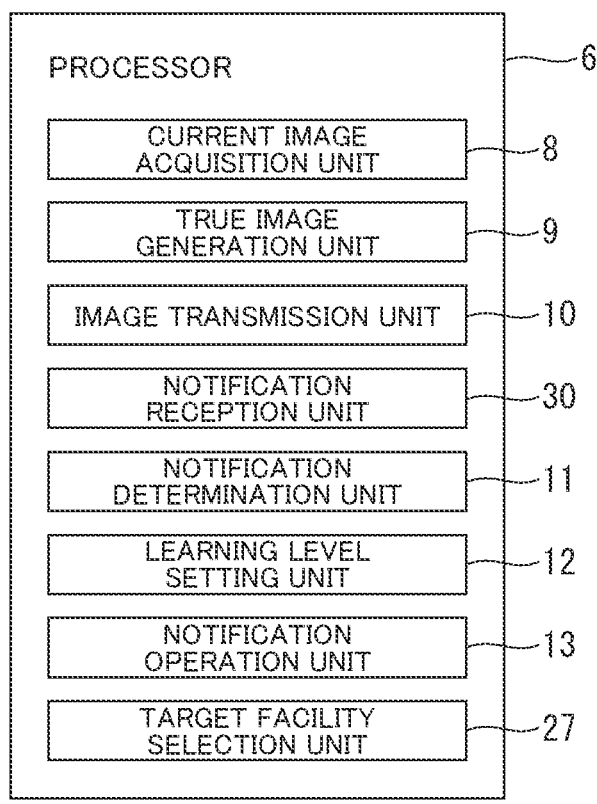
FIG. 16 is a block diagram illustrating an internal structure of the processor of the server apparatus.
Figure 17:
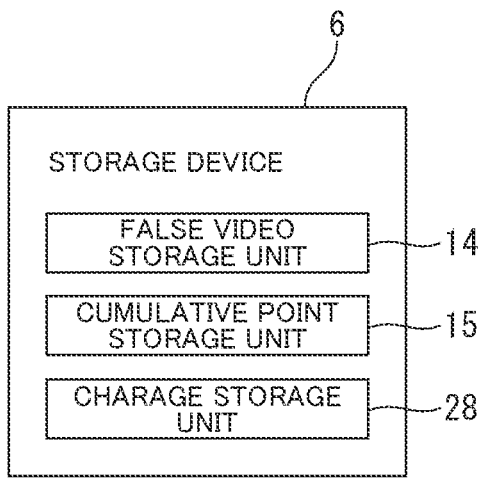
FIG. 17 is a block diagram illustrating an internal structure of the storage device of the server apparatus.
Figure 18:
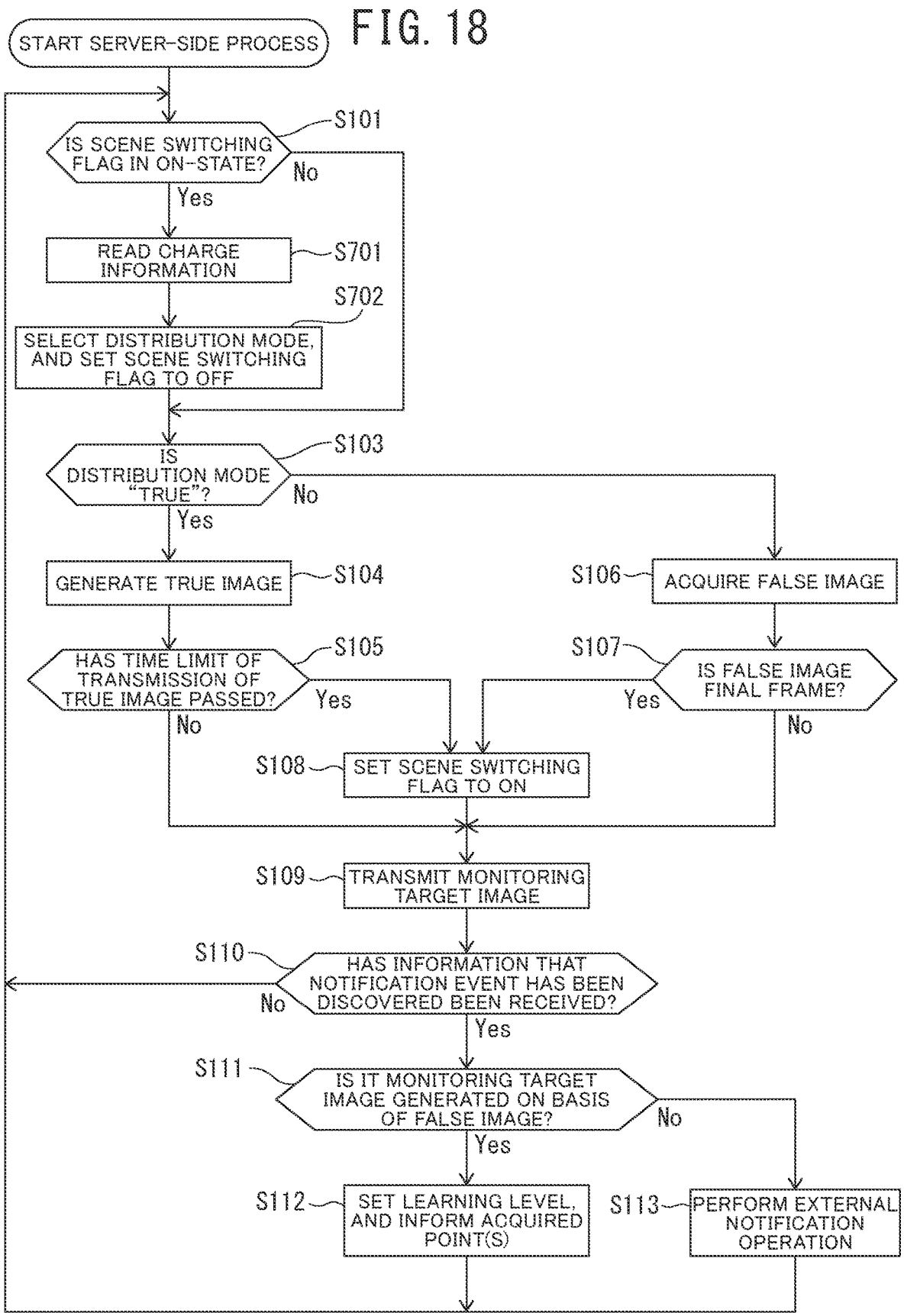
FIG. 18 is a flowchart illustrating a server-side process.

A fifth embodiment is different from the first embodiment in that the processor 5 of the server apparatus 2 functions as a target facility selection unit 27, as illustrated in FIG. 16; the storage device 6 of the server apparatus 2 includes a charge storage unit 28, as illustrated in FIG. 17; and steps S701 and S702 are included instead of step S102 of FIG. 5, as illustrated in FIG. 18.

The charge storage unit 28 stores information (hereinafter also referred to as "charge information") that allows for judging a magnitude of the amount of a usage fee for using the monitoring system 100 paid by a facility (for example, the owner or the manager of the facility) having a predetermined space to be captured by at least one of the image capturing devices 1, namely, a monitoring target facility. As the charge information, for example, there can be used information indicating to which of plural levels of ranks the amount of the usage fee paid by the facility belongs and information indicating a ranking of amounts of usage fees paid by facilities.

At step S701, the target facility selection unit 27 selects, from among a plurality of facilities, one facility (hereinafter also referred to as "target facility") whose image is distributed. The target facility selection unit 27 refers to the charge information stored in the charge storage unit 28, and selects such that among the plurality of facilities, the selection frequency of the image capturing devices 1 installed in a facility that has paid a higher usage fee becomes higher.

At step S702, the image transmission unit 9 selects whether to transmit a true image generated at step S104 or a false image generated on the basis of the false video stored in the false video storage unit 14. The image transmission unit 9 refers to the charge information of the target facility stored in the charge storage unit 28, and, if the target facility is a facility that has paid a higher usage fee, more increases the selection frequency of the false image. Next, according to the selection, the image transmission unit 9 sets the distribution mode to "true" or "false". If the distribution mode is set to "false", a false video having a difficulty level in accordance with the learning level of the user of the terminal device 3 is selected. Subsequently, the scene switching flag is set to the OFF-state, and the process proceeds to step S103.

Note that, at step S104, a current image output from at least one of the image capturing devices 1 installed in the target facility selected at step S701 is used as a current image to be acquired.

In addition, for example, at step S106, in a case of using, as a false image to be transmitted to the terminal device 3, an image obtained by overwriting a false contour on a background image, the false video storage unit 14 may prestore a plurality of false contours in which facility types of facilities having a predetermined space to be captured by the image capturing device 1, such as nursing homes, preschools, and bars, are set. In this case, if transmission of a false video is selected, a false video of the facility type of the facility (target facility) selected at step S701 is used from among the plurality of false videos stored in the false video storage unit 14. For example, in the case of a false video in which a preschool teacher hits a preschool child, if the target facility is a preschool, the false video is used, whereas if the target facility is a bar, it is not used.

As described hereinabove, in the monitoring system 100 according to the fifth embodiment of the present invention, the server apparatus 2 includes the target facility selection unit 27 configured to select one target facility from among the plurality of facilities and the charge storage unit 28 configured to store the charge information indicating information that allows for judging the magnitude of the amount of a usage fee paid by each facility. The target facility selection unit 27 refers to the charge information stored in the charge storage unit 28, and increases the selection frequency of the image capturing devices 1 installed in a facility that has paid a higher usage fee. As a result, a monitoring target image of the facility that has paid the higher usage fee is more frequently distributed than those of other facilities, thereby enabling more enhancement of monitoring.

Additionally, the image transmission unit 9 refers to the usage fee paid by the facility stored in the charge storage unit 28, and more increases the selection frequency of the false image in the facility that has paid the higher usage fee. This can more improve the skill and willingness of the user of the terminal device 3 to monitor the facility that has paid the high usage fee. Note that the function of referring to the charge information to select a target facility is independent from the function of referring to the charge information to determine the selection frequency of the false image. Thus, even in the case where reference to the charge information is not made to select a target facility, the function of referring to the charge information to determine the selection frequency of the false image can be implemented.

(Modifications)

(1) Note that while the monitoring system 100 according to the fifth embodiment of the present invention has been described using the example in which a monitoring target facility is selected by the server apparatus 2, other structures can also be employed. For example, the monitoring target facility may be selected by the user of the terminal device 3. Specifically, it may be structured that the terminal device 3 includes a selection signal transmission unit (unillustrated) configured to transmit to the server apparatus 2 a selection signal indicating a selected facility in response to a facility selection operation by the user of the terminal device 3 on the basis of output from the input reception unit 18, and the target facility selection unit 27 of the server apparatus 2 acquires the selection signal from the terminal device 3 and selects the facility indicated by the acquired selection signal. This allows the user of the terminal device 3 to select the monitoring target facility.

In this case, allowing the user of the terminal device 3 to select a facility that has paid a higher usage fee can not only more improve the display frequency of the false image by which points can be acquired, but also improve the monitoring skill by repetitively selecting a specific facility to increase the learning level of the user. This enables users of many terminal devices 3 to willingly select a facility that has paid a high usage fee, as a result of which monitoring of the facility that has paid the high usage fee can be more enhanced.

(2) Additionally, for example, it may be structured that the terminal device 3 includes a position information acquisition unit (unillustrated) configured to acquire position information, such as GPS receiver or the like, and the target facility selection unit 27 acquires the position information from the terminal device 3 to prohibit selection of a facility, among a plurality of facilities, which the user of the terminal device 3 can reach in a predetermined time. This can prevent misuse of the monitoring system 100.

In addition, for example, when it is determined that a predetermined designated time has passed after selecting a facility, the target facility selection unit 27 may automatically select another facility. This can limit the monitoring time for the same facility. In this case, selection of a facility that has been selected in the past is prohibited for a predetermined designated time. As a result, time interval can be set when monitoring the same facility again, which can prevent stalking by the user of the terminal device 3.

(3) Additionally, for example, it may be structured that the terminal device 3 includes a selection order signal transmission unit (unillustrated) configured to transmit to the server apparatus 2 a selection order signal indicating an input selection order in response to an operation of input of a facility selection order by the user of the terminal device 3 on the basis of output from the input reception unit 18, and the target facility selection unit 27 acquires the selection order signal from the terminal device 3 to select a facility according to the selection order indicated by the acquired selection order signal. As a result, the user of the terminal device 3 can set a route for patrol, so that monitoring the same facility can improve the monitoring skill (the ability to discover a crime or the like) of the user of the terminal device 3.

(4) Additionally, for example, the terminal device 3 includes a warning signal transmission unit (unillustrated) configured to transmit a warning signal indicating that it is necessary to continue monitoring although there is no occurrence of a notification event such as a crime, according to an operation by the user of the terminal device 3 on the basis of output from the input reception unit 18. Additionally, the server apparatus 2 includes a flag setting unit (unillustrated) configured to acquire the warning signal from the terminal device 3, and on the basis of the acquired warning signal, set up a flag indicating whether or not it is necessary to continue monitoring in spite of no occurrence of a notification event such as a crime, which is set to the facility. Then, upon ending of the monitoring time of the terminal device 3 that has transmitted the warning signal or a predetermined time before the monitoring time thereof ends, the target facility selection unit 27 automatically selects another terminal device 3, then selects the image capturing device 1 where a flag is set up, and causes the selected other terminal device 3 to monitor.

(5) Additionally, for example, the monitoring system 100 according to the fifth embodiment may be structured to work together with a game that explores a labyrinth and collects items and characters. In this case, the user notifies the server apparatus 2 that he or she has discovered an item or a character as a notification event. A specified image capturing device 1 is previously associated with each room in the labyrinth, and when each room is opened, an image of the image capturing device 1 associated with the opened room is distributed. In this case, the item or the character is overwritten and displayed on a region of the monitoring target image having no foreground image, namely, a region where no moving body such as a person is displayed. Note that items and characters are prestored as videos or still images in the false video storage unit 14. Even without recording videos or still images in a nonvolatile memory (Read Only Memory), similar still images may be dynamically generated using computer graphics and the sequentially stored in a volatile memory (Random Access Memory) forming the false video storage unit 14. Furthermore, the method for notifying the server apparatus 2 may be changed between when a notification event such as a crime occurs and when an item or a character is discovered. For example, a position to be tapped or clicked on the screen may be different between the discovery of a crime and the discovery of an item or a character. Alternatively, an operation of the monitoring person, such as touching the screen, may be made different. Additionally, for example, a plurality of levels of usage fees may be set, and in a facility that has paid a higher usage fee, an appearance frequency of an item or a character and an appearance probability of a rare item or character may be increased.

Figure 19:
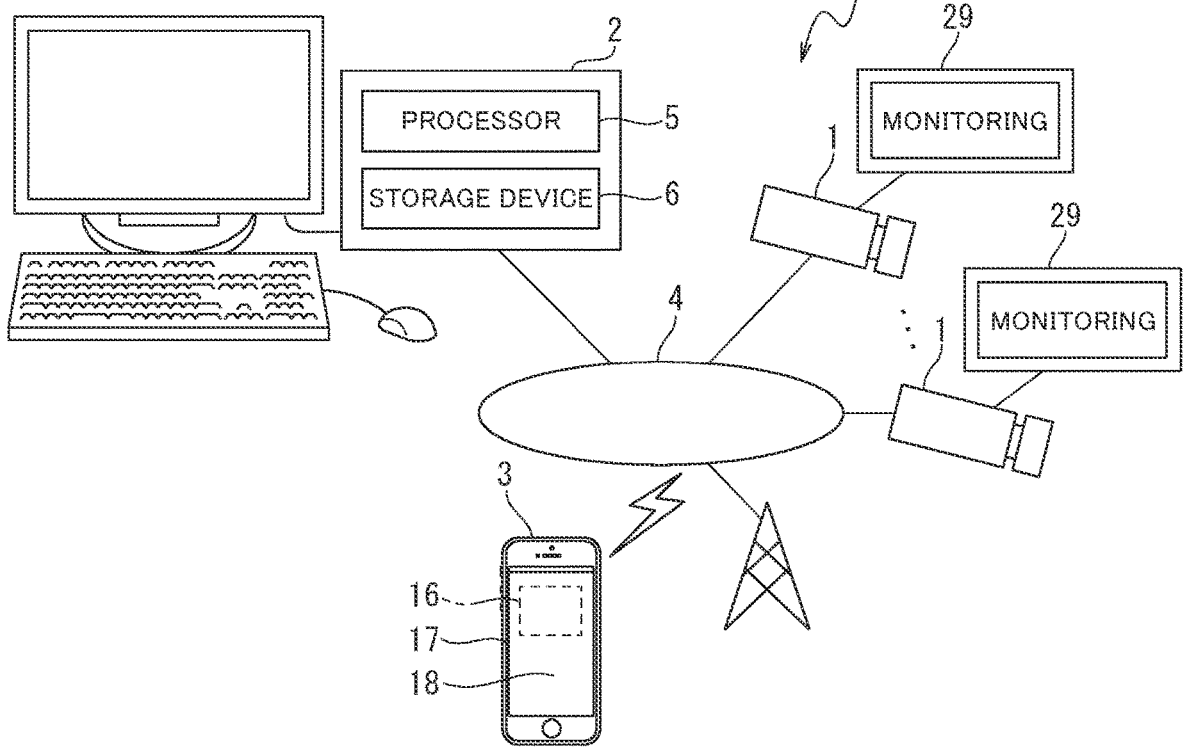
FIG. 19 is a conceptual diagram illustrating the structure of a monitoring system according to a modification.

(6) Additionally, the monitoring system 100 according to the fifth embodiment may be structured such that, as illustrated in FIG. 19, each image capturing device 1 includes a monitoring status informing unit 29 configured to inform a monitoring status to a predetermined space which is the monitoring target, and the monitoring status informing unit 29 of the image capturing device 1 may inform a status that indicates whether or not an image is being transmitted to one or more terminal devices 3. As the monitoring status informing unit 29, for example, there can be used an LED light that lights or blinks during monitoring, an electric bulletin board that displays a message such as "monitoring" during monitoring, or a liquid crystal display that displays a monitoring target image being transmitted during monitoring.

Additionally, for example, the monitoring status informing units 29 may be structured to include a normal mode in which the monitoring status informing unit 29 of the image capturing device 1 corresponding to the monitoring target image being transmitted to the terminal device 3 informs that the captured image of the image capturing device 1 is being monitored, as well as a dummy informing mode randomly executing an informing that the captured image of the image capturing device 1 is being monitored even when the captured image is not transmitted to the terminal device 3. This can be an intimidation to criminals or the like, and prevent occurrences of crimes or the like.

In addition, it may be structured that the true image of the image capturing device 1 can be viewed as an image informing a congestion status of the facility through a browser or a dedicated application of a terminal device (hereinafter also referred to as "congestion monitor terminal device") different from the terminal device 3 of the monitoring system of the present invention, and according to whether the true image is displayed by the congestion monitor terminal device or displayed by the terminal device 3, an informing pattern (for example, color, brightness, blinking rhythm, or blinking tempo) of the monitoring status informing unit 29 is changed. As a result, since the terminal device 3 of the monitoring system 100 of the present invention cannot monitor a facility close in distance, a person planning a crime cannot know the monitoring status of a crime target facility in real time. However, when the person himself or herself views the facility through the congestion monitor terminal device, he or she can confirm in real time a situation being informed by the monitoring status informing unit 29. Accordingly, the person has to believe even the informing by the dummy informing mode as a real one, which leads to crime deterrence. In addition, if the owner or manager of the facility (for example, the store master) recognizes that there is a user viewing through the congestion monitor terminal device when there are few customers, it is possible to reflect a discount placard in the image capturing device 1 and allow the user of the congestion monitor terminal device that has viewed the placard to obtain a screenshot so as to use it as a discount coupon for attracting customers.

Additionally, the monitoring status informing unit 29 may be structured to execute the informing after a predetermined delay from the start of transmission of a monitoring target image. For example, if the informing is executed simultaneously with the transmission of the monitoring target image, that is, simultaneously with the start of viewing, a crime or the like may be committed after confirming that the informing is not being made. Thus, in the case of executing the informing after a predetermined delay from the start of transmission of the monitoring target image, there is a possibility that monitoring is being performed even when there is not the informing, for example, unlike in the case of executing the informing simultaneously with the start of viewing. This can deter occurrence of a crime or the like when there is not the informing.

Figure 20:
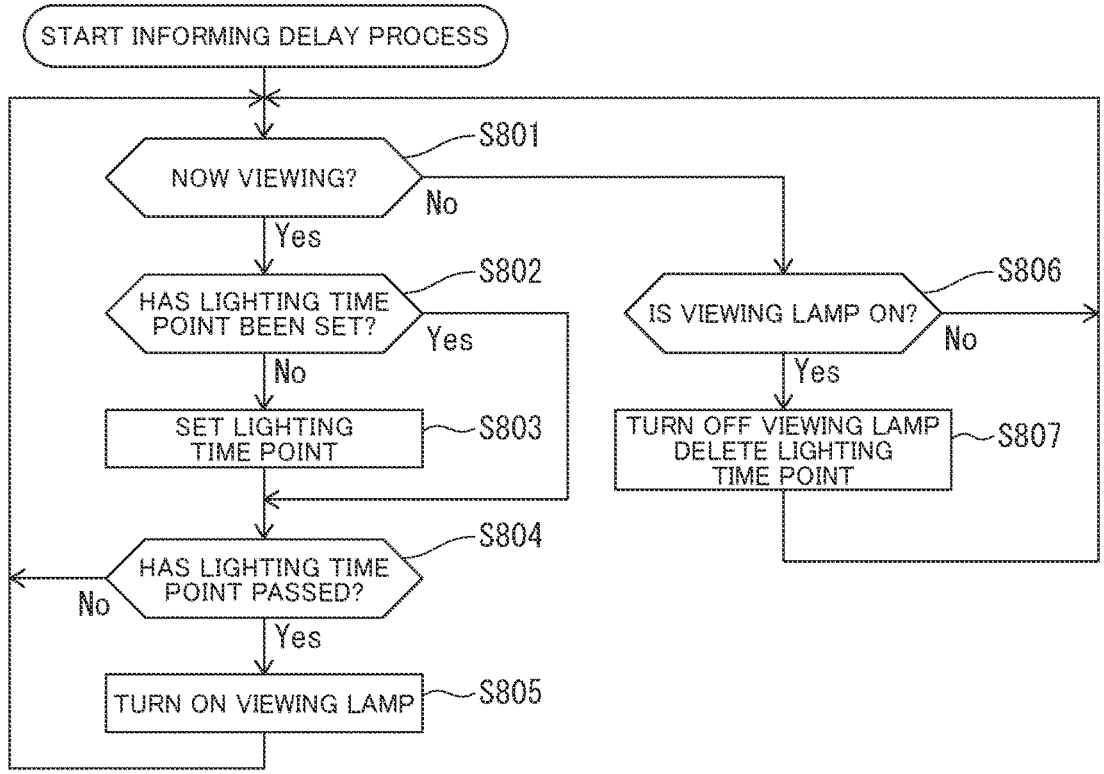
FIG. 20 is a flowchart illustrating an informing delay process.

As illustrated in FIG. 20, the monitoring status informing unit 29 sets a time point after a predetermined delay from the start of transmission of the monitoring target image to an informing start time point (hereinafter also referred to as "lighting time point"). In an informing delay process of FIG. 20, first, at step S801, the monitoring status informing unit 29 determines whether or not the captured image of the image capturing device 1 corresponding to the monitoring status informing unit 29 is being displayed on the terminal device 3, namely, whether the user of the terminal device 3 is viewing or not. Then, it determines that the user is viewing (Yes), the process proceeds to step S802. On the other hand, if it determines that the user is not viewing (No), the process proceeds to step S806.

At step S802, the monitoring status informing unit 29 determines whether or not the lighting time point has been set. Then, it determines that the lighting time point has been set (Yes), the process proceeds to step S804. On the other hand, if it determines that the lighting time point has not been set or has been deleted (No), as will be described later, the process proceeds to step S803.

At step S803, the monitoring status informing unit 29 sets, as the lighting time point, a time point after a predetermined delay from a current time point, and then, the process proceeds to step S804.

At step S804, the monitoring status informing unit 29 determines whether or not a current time point has passed the lighting time point set at step S803. Then, it determines that the current time has passed the lighting time point (Yes), it is determined that informing of the monitoring status is permitted, and the process proceeds to step S805. On the other hand, if it determines that the lighting time point has not passed (No), the process returns to step S801.

At step S805, the monitoring status informing unit 29 starts an informing that the captured image of the image capturing device 1 is being monitored, by such as turn-on of the LED light (viewing lamp), and then, the process proceeds to step S801.

On the other hand, at step S806, the monitoring status informing unit 29 determines whether or not the LED light (viewing lamp) is ON even though monitoring the video of the image capturing device 1 has ended, that is, whether or not the informing is being executed in spite of the ending of the monitoring. Then, it is determined that the informing is being executed in spite of the ending of the monitoring (Yes), the process proceeds to step S807. On the other hand, it is determined that the informing is not being executed (No), the process returns to step S801.

At step S807, the monitoring status informing unit 29 ends the informing that the captured image of the image capturing device 1 is being monitored, by such as turn-off of the LED light (viewing lamp). Next, it cancels, namely, deletes the setting of the lighting time point set at step S803, and then, the process proceeds to step S801.

Note that, at step S807, although the LED light (viewing lamp) is turned off simultaneously with the ending of the monitoring, it may be turned off for the first time after a predetermined time from the ending of the monitoring, similarly to when it is turned on.

In a flowchart of FIG. 20, when viewing once started ends before the LED light (viewing lamp) is turned on, this results in an operation that the LED light (viewing lamp) is turned on simultaneously with start of next-time viewing, and the delay operation cannot be performed. However, this is a rare case, and is not a problem in actual operation.

(7) Additionally, for example, as the plurality of terminal devices 3, there are used those including a position information acquisition unit configured to acquire position information, such as a GPS receiver, whereby the active user storage unit 23 consecutively acquires and stores latest position information of each terminal device 3 from all the terminal devices 3 in operation. If the notification operation unit 13 determines that discovery status information that a notification event has been discovered has been received even though the monitoring target image used as the target for the discovery is not an image generated on the basis of the false image (only the true image has been transmitted), it transmits the occurrence of the notification event and the position of the image capturing device 1 to one or more terminal devices 3 located close to the image capturing device 1. The users of the one or more terminal devices 3 which receives the information can take a video of the vicinity of a crime scene through a capturing images device (if the terminal devices 3 are smartphones, cameras incorporated in the smartphones). Due to that, even if it is impossible to take a video of an evidence of the crime itself, an escape route can be preempted, and thereby an opportunity for taking a video of the criminal on the run can be increased. While existing surveillance cameras are fixed and cannot be moved, the present modification allows a surveillance camera to be arranged at a necessary place when needed.

Note that when the terminal device 3 that has received information is a device capable of controlling an automobile, capturing images by an in-vehicle camera may be automatically started without waiting for operation to the terminal device 3 by the user. In this case, with use of position information of the image capturing devices 1, it may be automatically selected which in-vehicle camera should be used. Furthermore, with automatic driving of the automobile, it is possible to adjust the direction of the in-vehicle camera and move the automobile to an expected escape route.

The capturing images system of the escape route for taking a video of an escaping criminal may be started up not only when the above-described monitoring system 100 has transmitted information, but also, for example, when the occurrence of a crime and position information have been received from a security system detecting a voice for help and a scream through a voice recognition technology, a security system detecting a criminal behavior through an image recognition technology, police information, or the like.

Figure 21:
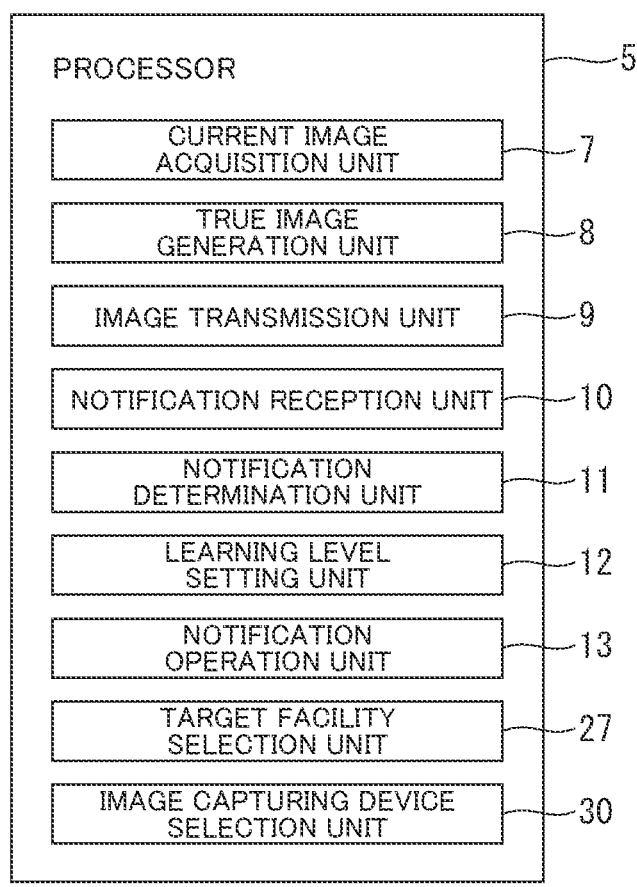
FIG. 21 is a block diagram illustrating an internal structure of the processor of the server apparatus.

(8) In addition, for example, it may be structured as follows. As illustrated in FIG. 21, the server apparatus 2 includes an image capturing device selection unit 30 configured to select one image capturing device 1 from among the plurality of image capturing devices 1. The image capturing device selection unit 30 detects person(s) from each of videos output by the plurality of image capturing devices 1, and when the number of persons detected from the video output by one image capturing device 1 increases from 1 to 2 or more, the image capturing device selection unit 30 selects the image capturing device 1. The current image acquisition unit 7 acquires, as a current image, a latest captured image output from the selected image capturing device 1. This can increase, for example, a probability of detection of a case where a woman was attacked by a robbery when she was working at a bar alone at midnight. Alternatively, instead of monitoring by the terminal device 3, a dummy informing by the monitoring status informing unit 29 may be made.

Furthermore, the image capturing devices 1 may include a voice acquisition unit. When the voice acquisition unit detects through voice recognition an utterance or scream of a keyword by which the occurrence of a crime is expected or detects through emotion recognition using voice an emotional surge by which the occurrence of a crime is expected, one image capturing device 1 including the voice acquisition unit concerned may be selected, and the current image acquisition unit 7 may acquire, as a current image, a latest captured image output from the selected image capturing device 1.

REFERENCE SIGNS LIST

1: Image capturing device
2: Server apparatus
3: Terminal device
4: Communication network
5: Processor
6: Storage device
7: Current image acquisition unit
8: True image generation unit
9: Image transmission unit
10: Notification reception unit
11: Notification determination unit
12: Learning level setting unit
13: Notification operation unit
14: False video storage unit
15: Cumulative point storage unit
16: Processor
17: Image display unit
18: Input reception unit
19: Monitoring target image acquisition unit
20: Monitoring target image display unit
21: Notification unit
22: Background image storage unit
23: Active user storage unit
24: Image storage unit
25: Terminal device
26: Original image storage unit
27: Target facility selection unit
28: Charge storage unit
29: Monitoring status informing unit
30: Image capturing device selection unit
100: Monitoring system

The invention claimed is:
1. A monitoring system comprising:
a server apparatus and a image capturing device configured to capture an image of a predetermined space to be monitored and output the captured image to the server apparatus,
wherein the server apparatus includes a current image acquisition unit configured to acquire a latest captured image as a current image,
a true image generation unit configured to generate, as a true image, an image obtained by subjecting the current image to a privacy protection process that makes it difficult to identify a person in the current image,
a false video storage unit configured to store a video, a still image, or information for generating the still image and be capable of extracting one frame of the video or the still image as a false image for use in determining whether or not a monitoring is being appropriately performed by a monitoring person, an image transmission unit configured to transmit a monitoring target image generated on a basis of either the true image or the false image or a monitoring target image generated on a basis of both the true image and the false image to a terminal device, a notification reception unit configured to receive, from the terminal device, a discovery status information indicating whether or not a user of the terminal device has discovered a notification event in the monitoring target image, and a notification determination unit configured to, upon receipt of the discovery status information that a notification event has been discovered, determine whether or not the monitoring target image notified of the discovery is an image generated on the basis of only the false image or an image generated on the basis of both the true image and the false image.

2. The monitoring system according to claim 1, wherein the false video storage unit stores, as the video, a false video created to resemble a video obtained by the image capturing device upon occurrence of a crime that is an event to be notified in the predetermined space, the false video being extractable as the false image in units of frames.

3. The monitoring system according to claim 2, wherein the false video is subjected to the privacy protection process, and then stored in the false video storage unit.

4. The monitoring system according to claim 2,
wherein the false video is stored in the false video storage unit without being subjected to the privacy protection process, and
wherein when generating the monitoring target image on the basis of the false image, the monitoring target image is subjected to the privacy protection process.

5. The monitoring system according to claim 1, wherein when the notification determination unit determines that the monitoring target image is an image generated on the basis of the false image, the server apparatus notifies the terminal device that a task of transmitting information that a notification event has been discovered has been properly handled.

6. The monitoring system according to claim 1, wherein the server apparatus includes a learning level setting unit configured to set a learning level for the user of the terminal device according to the number of times the notification determination unit has determined that the monitoring target image is an image generated on the basis of the false image.

7. The monitoring system according to claim 6,
wherein the false video storage unit stores a plurality of false videos having different difficulty levels, and
wherein when generating the monitoring target image on the basis of the false image, the image transmission unit selects the false video having a difficulty level in accordance with the learning level of the user of the terminal device set by the learning level setting unit.

8. The monitoring system according to claim 1,
wherein the server apparatus includes a background image storage unit configured to store at least one captured image as a background image;
wherein the true image generation unit extracts a contour of a foreground image cut out from the current image on a basis of a difference between the background image and the current image, and overwrites the extracted contour on the background image to generate the true image;

wherein the false video storage unit stores, as the false image, a false contour that is a contour extracted from the foreground image cut out from each frame of the false video; and
wherein the image transmission unit transmits, as the monitoring target image, either the true image generated by the true image generation unit or a transmission false image obtained by overwriting the false contour stored in the false video storage unit on the background image.

9. The monitoring system according to claim 1,
wherein the server apparatus includes a background image storage unit configured to store at least one frame of the video as a background image;
wherein the true image generation unit extracts a contour of a foreground image cut out from the current image on a basis of a difference between the background image and the current image, and overwrites the extracted contour on the background image to generate the true image;
wherein the false video storage unit stores, as the false image, a false contour that is a contour extracted from the foreground image cut out from each frame of the false video; and
wherein the image transmission unit transmits, as the monitoring target image, either the true image generated by the true image generation unit or a transmission false image obtained by overwriting the false contour stored in the false video storage unit on a region of the true image where the contour of the foreground image of the current image is not present.

10. The monitoring system according to claim 1, wherein the server apparatus includes a notification operation unit configured to, when the notification determination unit determines that the monitoring target image used as the target for the discovery is not an image generated on the basis of the false image, perform an external notification operation for notifying that the discovery status information that a notification event has been discovered has been received from the terminal device.

11. The monitoring system according to claim 10, wherein when it is determined that the monitoring target image used as the target for the discovery is not an image generated on the basis of the false image, the notification operation unit transmits a plurality of the continuous monitoring target images or a plurality of the true images used for generation of the plurality of the monitoring target images retroactively from the monitoring target image to a terminal device different from the terminal device that has transmitted the discovery status information, as the external notification operation.

12. The monitoring system according to claim 10, wherein when it is determined that the monitoring target image used as the target for the discovery is not an image generated on the basis of the false image, the notification operation unit transmits a plurality of the continuous current images retroactively from the current image used for generation of the true image used for generation of the monitoring target image to a predetermined specific terminal device, as the external notification operation.

13. The monitoring system according to claim 10,
wherein the server apparatus sequentially acquires position information from each of all the terminal devices in operation; and
wherein when it is determined that the monitoring target image used as the target for the discovery is not an image generated on the basis of the false image, the notification operation unit transmits the occurrence of a notification event and a position of the image capturing device to at least one of the terminal devices located close to the position of the image capturing device, as the external notification operation.

14. The monitoring system according to claim 1, including a plurality of image capturing devices, each serving as the image capturing device,
wherein the server apparatus includes a charge storage unit configured to store charge information that is information allowing for judging a magnitude of an amount of a usage fee paid by a facility having the predetermined space and a target facility selection unit configured to select one target facility from among a plurality of facilities;
wherein the current image acquisition unit acquires, as the current image, the latest captured image output from the image capturing device installed in the target facility; and
wherein the target facility selection unit refers to the charge information stored in the charge storage unit, and more increases a frequency of selection of the image capturing device installed in a facility that has paid a higher usage fee among a plurality of facilities.

15. The monitoring system according to claim 1, including a plurality of image capturing devices, each serving as the image capturing device,
wherein the server apparatus includes a charge storage unit configured to store charge information that is information allowing for judging a magnitude of an amount of a usage fee paid by a facility having the predetermined space and a target facility selection unit configured to select one target facility from among the plurality of facilities;
wherein the current image acquisition unit acquires, as the current image, the latest captured image output from the image capturing device installed in the target facility; and
wherein the image transmission unit refers to the charge information of the target facility stored in the charge storage unit and when the target facility is a facility that has paid a higher usage fee, increases a frequency of selection of the false video.

16. The monitoring system according to claim 1,
wherein the server apparatus includes a target facility selection unit configured to select one target facility from among a plurality of facilities;
wherein the current image acquisition unit acquires, as the current image, the latest captured image output from the image capturing device installed in the target facility; and
wherein the target facility selection unit acquires position information from the terminal device, and prohibits selection of a facility where the user of the terminal device can reach in a predetermined time from among the plurality of facilities.

17. The monitoring system according to claim 1, including a plurality of image capturing devices, each serving as the image capturing device,
wherein each of the image capturing devices including a monitoring status informing unit configured to inform a monitoring status of a captured image of the each image capturing device to the predetermined space, in which the monitoring status informing unit of an image capturing device corresponding to a monitoring target image being transmitted to the terminal device informs that a captured image of the image capturing device is being monitored.

18. The monitoring system according to claim 17, wherein the monitoring status informing unit executes the informing after a predetermined delay from start of transmission of the monitoring target image to the terminal device.

19. The monitoring system according to claim 17, wherein, the monitoring status informing unit includes a normal mode in which the monitoring status informing unit of the image capturing device corresponding to the monitoring target image being transmitted to the terminal device informs that the captured image of the image capturing device is being monitored, as well as a dummy informing mode executing the informing that the captured image of the image capturing device is being monitored even when the monitoring is not being performed.

20. The monitoring system according to claim 1, including a plurality of image capturing devices, each serving as the image capturing device,
wherein the server apparatus includes an image capturing device selection unit configured to detect at least one person from each of images output by the plurality of image capturing devices, and, when the number of persons detected from the image output by the image capturing device increases from 1 to 2 or more, selects the image capturing device; and
wherein the current image acquisition unit acquires, as the current image, a latest captured image output from the image capturing device selected by the image capturing device selection unit.

21. A monitoring system configured to display a monitoring target image received from a server apparatus on a terminal device and transmit a status on whether or not a user of the terminal device has discovered a notification event in the monitoring target image as discovery status information to the server apparatus,
wherein the monitoring target image is an image generated on a basis of either a true image or a false image or an image generated on a basis of both the true image and the false image;
wherein the true image is an image obtained by using, as a current image, a latest captured image obtained by capturing an image of a predetermined space to be monitored by an image capturing device and subjecting the current image to a privacy protection process that makes it difficult to identify a person in the current image;
wherein the false image is an image for use in determining whether or not a monitoring is being appropriately performed by a monitoring person, the false image being an image extracted in units of frames from a video or a still image; and
wherein when the discovery status information is information that a notification event has been discovered, it is determined whether the monitoring target image notified of the discovery is an image generated on a basis of only the false image or an image generated on a basis of both the true image and the false image.

22. The monitoring system according to claim 21, wherein the false image is an image extracted in units of frames from a false video created to resemble a video obtained by the image capturing device upon occurrence of a crime that is an event to be notified in the predetermined space.

23. The monitoring system according to claim 21, wherein when the monitoring target image is an image generated on the basis of the false image, the terminal device is informed that a task of transmitting information that a notification event has been discovered has been properly handled.

24. The monitoring system according to claim 21,
wherein the monitoring target image is a true image that is an image obtained by extracting a contour of a foreground image cut out from the current image on a basis of a difference between a background image previously acquired from the captured image of the predetermined space and the current image and overwriting the extracted contour on the background image, or
an image obtained by overwriting a false contour that is a contour extracted from a foreground image cut out for each frame from the false video on the background image.

25. The monitoring system according to claim 21,
wherein the monitoring target image is a true image that is an image obtained by extracting a contour of a foreground image cut out from the current image on a basis of a difference between a background image previously acquired from the captured image of the predetermined space and the current image and overwriting the extracted contour on the background image, or
an image obtained by overwriting a false contour that is a contour extracted from a foreground image cut out for each frame from the false video on a region of the true image where the contour of the foreground image is not present.

26. A monitoring method comprising:
(a) a step of capturing an image of a predetermined space to be monitored and outputting the captured image to a server apparatus;
(b) a step of acquiring a latest captured image as a current image;
(c) a step of transmitting a monitoring target image generated on a basis of either a true image or a false image or a monitoring target image generated on a basis of both the true image and the false image to a terminal device;
(d) a step of transmitting, as discovery status information, a status on whether or not a user of the terminal device has discovered a notification event in the monitoring target image to the server apparatus from the terminal device; and
(e) a step of, upon receipt of information that a notification event has been discovered as the discovery status information, determining whether or not the monitoring target image notified of the discovery is an image generated on the basis of only the false image or an image generated on the basis of both the true image and the false image,
wherein the true image is an image generated by subjecting the current image to a privacy protection process that makes it difficult to identify a person in the current image, and
the false image is an image for use in determining whether or not a monitoring is being appropriately performed by a monitoring person, the false image being an image extracted in units of frames from a video or a still image.

27. The monitoring method according to claim 26, wherein the false image is an image extracted in units of frames from a false video that is a video created to resemble a video obtained by the image capturing device upon occurrence of a crime that is an event to be notified in the predetermined space.

28. The monitoring method according to claim 27, comprising a step of, when at the step (e), it is determined that the monitoring target image used as the target for the discovery is not an image generated on the basis of the false image, performing an external notification operation for notifying that the discovery status information that a notification event has been discovered has been received from the terminal device.

29. The monitoring method according to claim 28, comprising transmitting a plurality of the continuous monitoring target images or a plurality of the true images used for generation of the plurality of the monitoring target images retroactively from the monitoring target image to a terminal device different from the terminal device that has transmitted the discovery status information, as the external notification operation.

30. The monitoring method according to claim 28, comprising a step of transmitting a plurality of the continuous current images retroactively from the current image used for generation of the true image used for generation of the monitoring target image to a predetermined specific terminal device, as the external notification operation.

31. The monitoring method according to claim 28, comprising a step of sequentially acquiring position information from each of all the terminal devices in operation and transmitting the occurrence of a notification event and a position of the image capturing device to at least one of the terminal devices located close to the position of the image capturing device, as the external notification operation.

* * * * *